(12) United States Patent
Nishino et al.

(10) Patent No.: US 8,662,602 B2
(45) Date of Patent: Mar. 4, 2014

(54) BRAKE CONTROL APPARATUS

(75) Inventors: Kimio Nishino, Hitachinaka (JP);
Toshiyuki Innami, Mito (JP); Kenichiro Matsubara, Kasumigaura (JP);
Toshiharu Sugawara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/340,106

(22) Filed: Dec. 29, 2011

(65) Prior Publication Data

US 2012/0091787 A1 Apr. 19, 2012

Related U.S. Application Data

(62) Division of application No. 12/188,942, filed on Aug. 8, 2008, now Pat. No. 8,167,383.

(30) Foreign Application Priority Data

Aug. 10, 2007 (JP) .................................. 2007-208869

(51) Int. Cl.
*B60T 8/94* (2006.01)
*B60T 8/88* (2006.01)

(52) U.S. Cl.
USPC ............. 303/122.05; 303/122.09; 303/122.13

(58) Field of Classification Search
USPC ................... 303/122, 122.04, 122.05, 122.08, 303/122.09, 122.1, 122.11, 122.12, 122.13, 303/122.14, 113.4
See application file for complete search history.

(56) References Cited

U.S. PATENT DOCUMENTS

| 5,255,962 | A | 10/1993 | Neuhaus et al. |
| 5,335,301 | A | 8/1994 | Newman et al. |
| 5,567,021 | A | 10/1996 | Gaillard |
| 5,588,720 | A | 12/1996 | Mattern |
| 5,609,399 | A | 3/1997 | Feigel et al. |
| 5,709,438 | A | 1/1998 | Isakson et al. |
| 5,752,751 | A * | 5/1998 | Nakaura et al. .......... 303/122.06 |

(Continued)

FOREIGN PATENT DOCUMENTS

DE 40 22 671 A1 1/1992
DE 43 10 061 A1 9/1994

(Continued)

OTHER PUBLICATIONS

U.S. Appl. No. 12/889,938, filed Aug. 8, 2008, Nishida.

(Continued)

*Primary Examiner* — Thomas J Williams
(74) *Attorney, Agent, or Firm* — Foley & Lardner LLP

(57) ABSTRACT

A brake control apparatus for a vehicle includes: a master cylinder for raising a wheel cylinder pressure according to operation of a brake pedal; a booster for raising the wheel cylinder pressure by operating the master cylinder independently of operation of the brake pedal; a pressure regulator provided with a hydraulic pump for raising the wheel cylinder pressure independently of operation of the master cylinder; and a control section including: a first controller for controlling the booster; and a second controller for controlling the pressure regulator. The control section detects that at least one of the booster and the first controller is in a state of malfunction; selects one of backup modes according to the state of malfunction, wherein the backup modes restrict operation of at least one of the booster and the pressure regulator in different manners; and controls the wheel cylinder pressure in the selected backup mode.

12 Claims, 4 Drawing Sheets

(56) References Cited

U.S. PATENT DOCUMENTS

| | | | |
|---|---|---|---|
| 5,845,976 A | 12/1998 | Muenster | |
| 5,852,788 A | 12/1998 | Toyoda et al. | |
| 5,954,406 A | 9/1999 | Sawada | |
| 6,157,887 A | 12/2000 | Zittlau | |
| 6,161,904 A | 12/2000 | Schmidt et al. | |
| 6,249,736 B1 | 6/2001 | Schmidt et al. | |
| 6,254,202 B1 | 7/2001 | Kawamoto | |
| 6,349,996 B1 | 2/2002 | Heckmann et al. | |
| 6,476,515 B1 | 11/2002 | Yamamoto et al. | |
| 6,634,724 B2 * | 10/2003 | Kobayashi et al. | 303/113.4 |
| 7,168,771 B2 | 1/2007 | Nakano | |
| 7,552,978 B2 | 6/2009 | Yokoyama et al. | |
| 7,673,948 B2 | 3/2010 | Otomo | |
| 8,167,383 B2 * | 5/2012 | Nishino et al. | 303/122.05 |
| 2001/0006308 A1 * | 7/2001 | Kawahata et al. | 303/122 |
| 2006/0066146 A1 | 3/2006 | Otomo | |
| 2008/0116740 A1 | 5/2008 | Yokoyama et al. | |
| 2008/0257670 A1 | 10/2008 | Drumm et al. | |
| 2009/0115242 A1 | 5/2009 | Ohtani et al. | |

FOREIGN PATENT DOCUMENTS

| | | |
|---|---|---|
| DE | 44 15 631 A1 | 11/1994 |
| DE | 43 43 314 A1 | 6/1995 |
| DE | 196 52 889 A1 | 6/1997 |
| DE | 197 03 776 A1 | 8/1998 |
| DE | 197 42 988 C1 | 1/1999 |
| DE | 198 07 366 A1 | 8/1999 |
| DE | 198 07 369 A1 | 8/1999 |
| DE | 100 33 835 A1 | 1/2002 |
| JP | 61-003058 U | 1/1986 |
| JP | 04221258 A * | 8/1992 |
| JP | 06-107152 A | 4/1994 |
| JP | 10-129446 A | 5/1998 |
| JP | 10-175538 A | 6/1998 |
| JP | 11-078819 A | 3/1999 |
| JP | 2000-247219 A | 9/2000 |
| JP | 2001-097193 A | 4/2001 |
| JP | 2001-138882 A | 5/2001 |
| JP | 2002-331925 | 11/2002 |
| JP | 2004-359060 A | 12/2004 |
| JP | 2006-123889 A | 5/2006 |
| JP | 2007-055560 A | 3/2007 |
| JP | 2007-112426 A | 5/2007 |
| JP | 2007-126032 A | 5/2007 |
| KR | 2006-0005226 A | 1/2006 |
| WO | WO 98/35867 A1 | 8/1998 |
| WO | WO 2006/046318 A1 | 5/2006 |
| WO | WO 2007/031398 A1 | 3/2007 |
| WO | WO 2007/034961 A1 | 3/2007 |

OTHER PUBLICATIONS

U.S. Appl. No. 12/188,938, filed Aug. 8, 2008, Nishino.
K. Nishino, U.S. PTO Office Action, U.S. Appl. No. 12/188,938, dated May 10, 2012, 19 pages.
K. Nishino, U.S. PTO Notice of Allowance, U.S. Appl. No. 12/188,938, dated Sep. 13, 2012, 7 pages.

* cited by examiner

BACKUP MODE 1

BACKUP MODE 2

BACKUP MODE 3, BACKUP MODE 4

BRAKE CONTROL APPARATUS

CROSS-REFERENCE TO RELATED PATENT APPLICATIONS

The present application is a Divisional of U.S. application Ser. No. 12/188,942, filed Aug. 8, 2008 which is based on Japanese Patent Application No. 2007-208869 filed on Aug. 10, 2007, the entire contents of which are incorporated herein by reference.

BACKGROUND OF THE INVENTION

The present invention relates generally to a brake control apparatus or system including: a master cylinder arranged to raise an internal pressure of a wheel cylinder (wheel cylinder pressure) of a vehicle in accordance with operation of an input device of the vehicle; a booster system for raising the wheel cylinder pressure by operating the master cylinder independently of operation of the input device; and a pressure regulator system with a hydraulic pressure source for raising the wheel cylinder pressure independently of operation of the master cylinder. The invention relates particularly to a brake control apparatus which is capable of controlling the wheel cylinder pressure even when the booster system is malfunctioning.

PCT International Publication No. WO98/35867 discloses an automotive brake system which includes a brake booster for assisting operation of a brake pedal by operating a master cylinder, and an ABS (Anti-lock Brake System) provided with a hydraulic pump. When the brake booster is failed, then the brake system controls wheel cylinder pressures by operating the hydraulic pump instead of the brake booster.

SUMMARY OF THE INVENTION

It is desirable to provide a brake control apparatus which is capable of controlling wheel cylinder pressures, where possible, by operating a booster system so as to produce a suitable braking force as desired by a driver, even when the booster system is malfunctioning.

According to one aspect of the present invention, a brake control apparatus comprises: a master cylinder arranged to raise an internal pressure of a wheel cylinder of a vehicle in accordance with operation of an input device of the vehicle; a booster arranged to raise the internal pressure of the wheel cylinder by operating the master cylinder independently of operation of the input device; a pressure regulator provided with a hydraulic pressure source, and arranged to raise the internal pressure of the wheel cylinder independently of operation of the master cylinder; and a control section including: a first controller connected for signal communication to the booster, and configured to control the booster; and a second controller connected for signal communication to the pressure regulator, and configured to control the pressure regulator, the control section being configured to: detect that at least one of the booster and the first controller is in a state of malfunction; select one of backup modes in accordance with the state of malfunction, wherein the backup modes restrict operation of at least one of the booster and the pressure regulator in different manners; and control the internal pressure of the wheel cylinder in the selected backup mode.

According to another aspect of the present invention, a brake control apparatus comprises: a master cylinder arranged to raise an internal pressure of a wheel cylinder of a vehicle in accordance with operation of an input device of the vehicle; a booster arranged to raise the internal pressure of the wheel cylinder by operating the master cylinder independently of operation of the input device, the booster including an electric motor arranged to operate the master cylinder; a pressure regulator provided with a hydraulic pressure source, and arranged to raise the internal pressure of the wheel cylinder independently of operation of the master cylinder; a plurality of sensors arranged to collect information used to measure an amount of operation of the input device; and a control section including: a first controller connected for signal communication to the booster, and configured to control the booster, the first controller including a processor, and a driver configured to drive the electric motor; and a second controller connected for signal communication to the pressure regulator, and configured to control the pressure regulator, the control section being configured to: detect that at least one of the booster and the first controller is in a state of malfunction; select one of backup modes in accordance with the state of malfunction, wherein the backup modes restrict operation of at least one of the booster and the pressure regulator in different manners, and the backup modes include first, second, third backup modes; select the first backup mode in response to detecting that the processor of the first controller is in a state of malfunction; select the second backup mode in response to detecting that the driver of the first controller is in a state of malfunction; select the third backup mode in response to detecting that at least one of the sensors is in a state of malfunction; and control the internal pressure of the wheel cylinder in the selected backup mode.

According to a further aspect of the present invention, a brake control apparatus comprises: a master cylinder arranged to raise an internal pressure of a wheel cylinder of a vehicle in accordance with operation of an input device of the vehicle; boosting means for raising the internal pressure of the wheel cylinder by operating the master cylinder independently of operation of the input device, the boosting means including an electric motor arranged to operate the master cylinder; pressure-regulating means for raising the internal pressure of the wheel cylinder independently of operation of the master cylinder, the pressure-regulating means including a hydraulic pressure source; means for collecting information used to measure an amount of operation of the input device; first control means for controlling the boosting means, the first control means including a processor, and drive means for driving the electric motor; second control means for controlling the pressure-regulating means; means for detecting that at least one of the boosting means and the first control means is in a state of malfunction; means for selecting one of backup modes in accordance with the state of malfunction, wherein the backup modes restrict operation of at least one of the boosting means and the pressure-regulating means in different manners, and the backup modes include first and second backup modes; means for detecting that the processor is in a state of malfunction, and generating a first signal indicative of a request for the first backup mode in response to detecting that the processor is in a state of malfunction; means for detecting that the drive means is in a state of malfunction, and generating a second signal indicative of a request for the second backup mode in response to detecting that the drive means is in a state of malfunction; means for controlling the internal pressure of the wheel cylinder by operating the pressure-regulating means in accordance with the measured amount of operation of the input device in response to generation of at least one of the first and second signals.

BRIEF DESCRIPTION OF THE DRAWINGS

FIG. 5A shows an example of how a hydraulic pressure in the brake control apparatus of FIG. 1 changes with time when in a backup mode 1, FIG. 5B shows an example of how the hydraulic pressure changes with time when in a backup mode 2, and FIG. 5C shows an example of how the hydraulic pressure changes with time when in the backup mode 3 or a backup mode 4.

DETAILED DESCRIPTION OF THE INVENTION

System Configuration of Brake Control Apparatus

Figure 1:
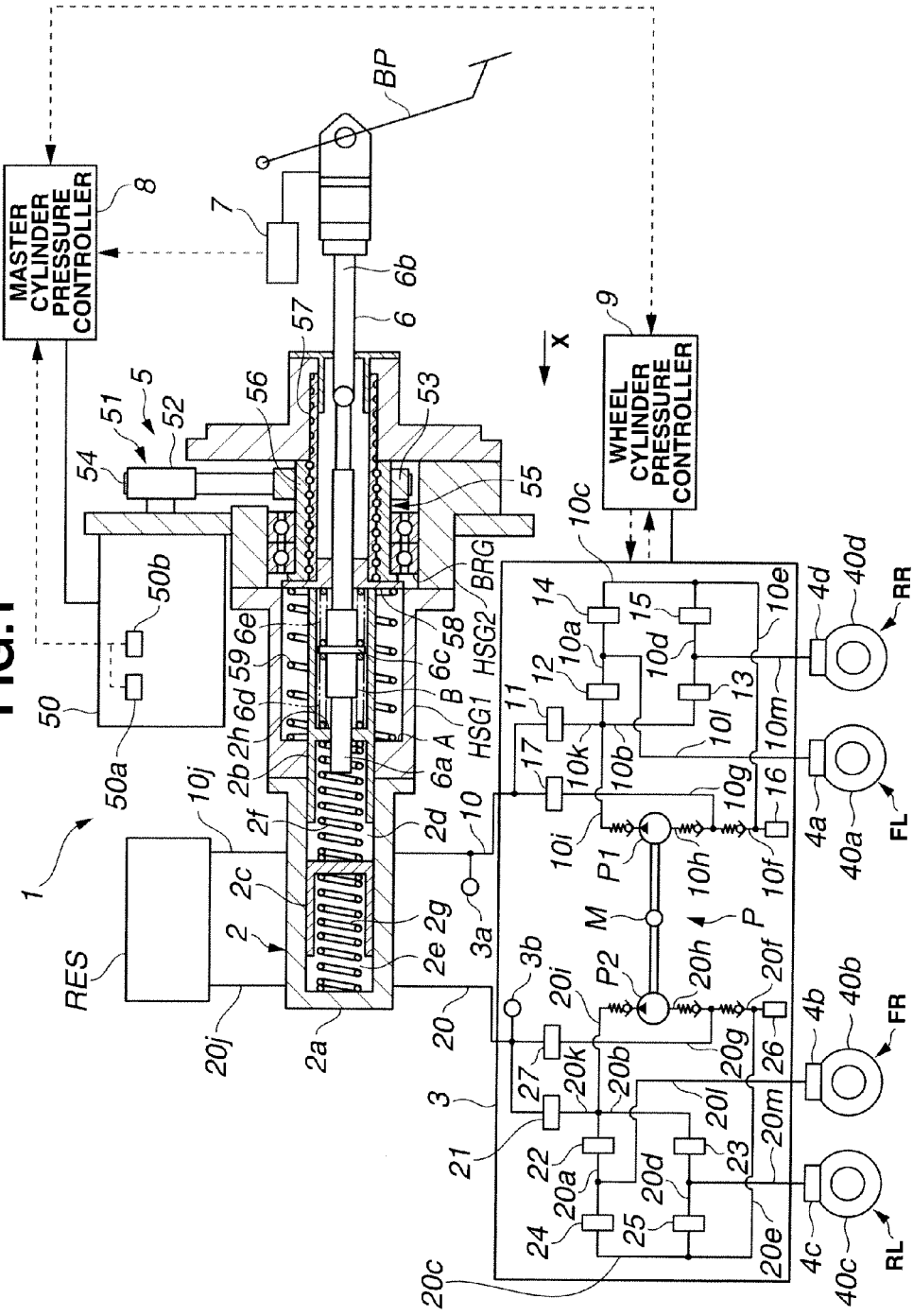
FIG. 1 is a schematic diagram showing system configuration of an automotive brake system provided with a brake control apparatus according to an embodiment of the present invention.

FIG. 1 schematically shows system configuration of an automotive brake system provided with a brake control apparatus according to an embodiment of the present invention. The automotive brake system includes four road wheels, i.e. a front left wheel "FL", a front right wheel "FR", a rear left wheel "RL", and a rear right wheel "RR". In FIG. 1, broken arrows indicate signal flows. For the following description, an x-axis is assumed as extending horizontally from the right to the left as viewed in FIG. 1.

A brake control apparatus 1 includes a master cylinder 2, a reservoir tank "RES", a pressure regulator (pressure-regulating means) or wheel cylinder pressure control mechanism 3, wheel cylinders 4a, 4b, 4c and 4d provided at respective ones of wheels FL, FR, RL and RR, a booster (boosting means) or master cylinder pressure control mechanism 5 coupled to master cylinder 2, an input rod 6, a brake operation sensor 7, a master cylinder pressure controller 8 for controlling the master cylinder pressure control mechanism 5, and a wheel cylinder pressure controller 9 for controlling the wheel cylinder pressure control mechanism 3. Master cylinder pressure controller 8 as a first controller (first control means) and wheel cylinder pressure controller 9 as a second controller (second control means) constitute a control section.

A brake pedal "BP" as an input device is adapted to be operated by a driver. Input rod 6 and brake pedal BP serve as a means for increasing or reducing an intern& pressure of master cylinder 2 (master cylinder pressure "Pmc"). Master cylinder pressure control mechanism 5 and master cylinder pressure controller 8 serve as another means for increasing or reducing the master cylinder pressure Pmc.

Master cylinder 2 has a longitudinal axis extending in the x-axis direction. Master cylinder 2 is of so-called a tandem type, and includes a primary piston 2b, and a secondary piston 2c which are disposed inside a hollow cylinder section 2a. A primary fluid chamber 2d is defined as a space surrounded by an inner peripheral surface of cylinder section 2a, and a longitudinal surface of primary piston 2b which faces in the positive x-axis direction, and a longitudinal surface of secondary piston 2c which faces in the negative x-axis direction. A secondary fluid chamber 2e is defined as a space surrounded by the inner peripheral surface of cylinder section 2a, a bottom surface of cylinder section 2a, and a longitudinal surface of secondary piston 2c which faces in the positive x-axis direction.

Primary fluid chamber 2d is hydraulically connected to a hydraulic circuit section 10 of wheel cylinder pressure control mechanism 3 for fluid communication, while secondary fluid chamber 2e is hydraulically connected to a hydraulic circuit section 20 of wheel cylinder pressure control mechanism 3 for fluid communication. The volumetric capacity of primary fluid chamber 2d is changed, when primary piston 2b and secondary piston 2c slide in cylinder section 2a relative to each other. A return spring 2f is disposed in primary fluid chamber 2d for biasing the primary piston 2b in the negative x-axis direction relative to secondary piston 2c. The volumetric capacity of secondary fluid chamber 2e is changed, when secondary piston 2c slides in cylinder section 2a. A return spring 2g is disposed in secondary fluid chamber 2e for biasing the secondary piston 2c in the negative x-axis direction.

Input rod 6 includes a first longitudinal end portion 6a extending through a division wall 2h of primary piston 2b, where first longitudinal end portion 6a is on the positive side of input rod 6 in the x-axis direction. First longitudinal end portion 6a of input rod 6 includes a part located in primary fluid chamber 2d. First longitudinal end portion 6a of input rod 6 is in fluid-tight contact with division wall 2h of primary piston 2b by sealing, and also arranged to slide relative to division wall 2h in the x-axis direction. Input rod 6 includes a second longitudinal end portion 6b linked to brake pedal BP, where second longitudinal end portion 6b is on the negative side of input rod 6 in the x-axis direction. Depression of brake pedal BP causes input rod 6 to move in the positive x-axis direction, and release of brake pedal BP causes input rod 6 to move in the negative x-axis direction.

Movement of input rod 6 and/or primary piston 2b in the positive x-axis direction pressurizes an operating fluid in primary fluid chamber 2d. The pressurized operating fluid in primary fluid chamber 2d is supplied to wheel cylinder pressure control mechanism 3 through hydraulic circuit section 10. The raised hydraulic pressure in primary fluid chamber 2d presses secondary piston 2c in the positive x-axis direction. Movement of secondary piston 2c in the positive x-axis direction pressurizes an operating fluid in secondary fluid chamber 2e. The pressurized operating fluid in secondary fluid chamber 2e is supplied to wheel cylinder pressure control mechanism 3 through hydraulic circuit section 20.

Since primary fluid chamber 2d can be pressurized by movement of input rod 6, depression of brake pedal BP can raise the master cylinder pressure Pmc so as to produce a braking force, even when an electric motor 50 for actuating the primary piston 2b is failed and stopped. The master cylinder pressure Pmc is transmitted through input rod 6 to brake pedal BP so as to generate a reaction force applied to brake pedal BP with no additional device such as a spring. This is advantageous for downsizing the brake control apparatus, and improving the mountability of the brake control apparatus to the vehicle.

Brake operation sensor 7 is disposed at second longitudinal end portion 6b of input rod 6 for sensing operation of brake pedal BP, and measuring a driver's request for braking force. Brake operation sensor 7 measures a displacement of input rod 6 in the x-axis direction, serving as a stroke sensor for measuring the stroke of brake pedal BP. In this embodiment, brake operation sensor 7 includes two displacement sensors 7a and 7b for outputting to master cylinder pressure controller 8 signals indicative of the displacement of input rod 6. The provision of the redundant displacement sensors enables to recognize a driver's request for braking force by one of the sensors, even when the other sensor becomes abnormal, and fails to output a signal.

Brake operation sensor 7 may be a depressing force sensor for measuring a depressing force applied to brake pedal BP, or be composed of a stroke sensor and a depressing force sensor.

Reservoir tank RES includes at least two fluid chambers which are separated from each other by a division wall. The fluid chambers of reservoir tank RES are respectively connected to primary fluid chamber 2d and secondary fluid chamber 2e of master cylinder 2 through fluid passages 10j and 20j.

Wheel cylinder pressure control mechanism 3 serves as a hydraulic control unit for vehicle dynamics controls such as ABS control, and vehicle behavior stabilizing control. Wheel cylinder pressure control mechanism 3 supplies a pressurized operating fluid to wheel cylinders 4a, 4b, 4c and 4d in response to a control signal outputted from wheel cylinder pressure controller 9.

Each wheel cylinder 4a, 4b, 4c or 4d is composed of a cylinder, a piston, a pad linked with the piston, etc. When supplied to each wheel cylinder 4a, 4b, 4c or 4d, the operating fluid moves the piston so as to press the pad to a disc rotor 40a, 40b, 40c or 40d. Since each disc rotor 40a, 40b, 40c or 40d is fixed to a respective one of wheels FL, FR, RL and RR, a braking torque applied to disc rotor 40a, 40b, 40c or 40d due to friction results in a braking force applied between the respective one of wheels FL, FR, RL and RR and a road surface.

Master cylinder pressure control mechanism 5 controls the displacement of primary piston 2b in the x-axis direction in order to control the master cylinder pressure Pmc, in response to a control signal outputted from master cylinder pressure controller 8. Master cylinder pressure control mechanism 5 includes electric motor 50, a speed reducer 51, and a rotation-translation converter 55.

Master cylinder pressure controller 8 includes a processing circuit which receives sensor signals from brake operation sensor 7 and electric motor 50, and a control signal from wheel cylinder pressure controller 9, and controls operation of electric motor 50 in accordance with the sensor signals and the control signal.

Wheel cylinder pressure controller 9 includes a processing circuit which computes a desired braking force of wheels FL, FR, RL and RR on the basis of an inter-vehicle distance relative to a preceding vehicle, road information, state variables of the host vehicle such as a yaw rate, longitudinal acceleration, lateral acceleration, handle steering angle, wheel speeds, and vehicle speed. On the basis of the result of the computation, wheel cylinder pressure controller 9 controls operation of actuators of wheel cylinder pressure control mechanism 3 such as solenoid valves and hydraulic pumps.

Master cylinder pressure controller 8 and wheel cylinder pressure controller 9 communicate with each other, and share control signals, state variables of the vehicle, information concerning malfunctions, operating states of master cylinder pressure controller 8 and wheel cylinder pressure controller 9.

Wheel Cylinder Pressure Control Mechanism

The following describes a hydraulic circuit of wheel cylinder pressure control mechanism 3. The hydraulic circuit includes two sections independent from each other, i.e. includes a primary section and a secondary section. The primary section receives an operating fluid from primary fluid chamber 2d of master cylinder 2, and controls braking forces of front left and rear right wheels FL and RR through hydraulic circuit section 10. The secondary section receives an operating fluid from secondary fluid chamber 2e of master cylinder 2, and controls braking forces of front right and rear left wheels FR and RL through hydraulic circuit section 20. In this way, the hydraulic circuit includes so called an X-pipe arrangement. Accordingly, even when one of the primary and secondary sections is failed, the other section can produce braking forces at diagonal two wheels, keeping the dynamic behavior of the vehicle stable.

The following describes the primary section which has a construction identical to that of the secondary section. An outlet gate valve 11 is disposed in a fluid passage 10k of hydraulic circuit section 10 between master cylinder 2 (on an upstream side) and a set of front left and rear right wheel cylinders 4a and 4d (on a downstream side). Outlet gate valve 11 is opened, when the operating fluid pressurized by master cylinder 2 is to be supplied to front left and rear right wheel cylinders 4a and 4d.

A downstream end of fluid passage 10k is branched into fluid passages 10a and 10b which are respectively connected to front left and rear right wheel cylinders 4a and 4d through fluid passages 10l and 10m. Pressure-increasing valves 12 and 13 are provided in fluid passages 10a and 10b, respectively. Pressure-increasing valves 12 and 13 are opened, when the operating fluid pressurized by master cylinder 2 or a hydraulic pump "P" as a hydraulic pressure source is to be supplied to front left and rear right wheel cylinders 4a and 4d.

Fluid passages 10a and 10b are respectively connected to return passages 10c and 10d on the downstream side of pressure-increasing valves 12 and 13. Pressure-reducing valves 14 and 15 are provided in return passages 10c and 10d, respectively. Pressure-reducing valves 14 and 15 are opened, when internal pressures of front left and rear right wheel cylinders 4a and 4d (wheel cylinder pressures Pwc) are to be reduced. Return passages 10c and 10d are connected to a single return passage 10e. Return passage 10e is connected to an internal reservoir 16.

A suction passage 10g is branched from a point of hydraulic circuit section 10 on the upstream side of outlet gate valve 11. An inlet gate valve 17 is provided in suction passage 10g for selectively allowing or inhibiting fluid communication through suction passage 10g. For example, inlet gate valve 17 is opened, when the operating fluid pressurized by master cylinder 2 is to be supplied to hydraulic pump P so that hydraulic pump P may further pressurize the operating fluid and supply it to front left and rear right wheel cylinders 4a and 4d. Suction passage 10g and a return passage 10f, which is connected to internal reservoir 16, is connected to a suction passage 10h.

Hydraulic circuit section 10 includes hydraulic pump P as a hydraulic pressure source, other than master cylinder 2, for raising the wheel cylinder pressures Pwc. Hydraulic pump P is of a gear type, including a first hydraulic pump P1, and a second hydraulic pump P2. For example, when a higher hydraulic pressure than the hydraulic pressure generated by master cylinder 2 is requested under a condition of automatic braking, such as a condition of vehicle behavior stabilizing control, then hydraulic pump P is controlled to supply a higher hydraulic pressure than the master cylinder pressure Pmc to front left and rear right wheel cylinders 4a and 4d. First hydraulic pump P1 is connected to suction passage 10h and discharge passage 10i, and connected to fluid passage 10k through discharge passage 10i.

Electric motor M is a DC (Direct Current) brushless motor, and includes an output shaft which is connected to first hydraulic pump P1 and second hydraulic pump P2. Electric motor M is energized by an electric power supplied in accordance with a control signal outputted from wheel cylinder pressure controller 9, and is arranged to drive first hydraulic pump P1 and second hydraulic pump P2.

Outlet gate valve 11, inlet gate valve 17, pressure-increasing valves 12 and 13, and pressure-reducing valves 14 and 15 are electromagnetic valves which are opened or closed by energizing or de-energizing solenoids thereof. The openings of these valves are individually controlled by being applied with drive currents according to drive signals outputted from wheel cylinder pressure controller 9.

Outlet gate valve 11 and pressure-increasing valves 12 and 13 are normally open valves, while inlet gate valve 17 and pressure-reducing valves 14 and 15 are normally closed valves. This allows the operating fluid pressurized by master cylinder 2 to reach front left and rear right wheel cylinders 4a and 4d so as to produce a braking force as desired by a driver, even when electric power supply to the valves is stopped abnormally. However, the valves are not so limited, but outlet gate valve 11 and pressure-increasing valves 12 and 13 may be normally closed valves, and inlet gate valve 17 and pressure-reducing valves 14 and 15 may be normally open valves.

Hydraulic circuit section 20 has a construction similar to hydraulic circuit section 10.

A master cylinder pressure sensor 3a is provided in hydraulic circuit section 10 between master cylinder 2 and wheel cylinder pressure control mechanism 3 for measuring the master cylinder pressure Pmc, i.e. measuring the hydraulic pressure in primary fluid chamber 2d of master cylinder 2. A master cylinder pressure sensor 3b is provided in hydraulic circuit section 20 within wheel cylinder pressure control mechanism 3 for measuring the master cylinder pressure Pmc, i.e. measuring the hydraulic pressure in secondary fluid chamber 2e of master cylinder 2. Master cylinder pressure sensors 3a and 3b output signals indicative of the master cylinder pressure Pmc to master cylinder pressure controller 8 and wheel cylinder pressure controller 9. The number and positions of master cylinder pressure sensors may be suitably determined in consideration of controllability, failsafe features, etc.

The following describes operation of wheel cylinder pressure control mechanism 3 under braking control. Under a condition of normal control, the operating fluid in master cylinder 2 is supplied to wheel cylinders 4a, 4b, 4c and 4d through hydraulic circuit sections 10 and 20, producing a braking force.

Under a condition of ABS control, for front left wheel FL, front left wheel cylinder 4a is depressurized by opening the pressure-reducing valve 14 and closing the pressure-increasing valve 12 so as to drain the operating fluid from front left wheel cylinder 4a. When front left wheel FL recovers from a lock state by the depressurization, then front left wheel cylinder 4a is pressurized again by opening the pressure-increasing valve 12 and closing the pressure-reducing valve 14. At the time, hydraulic pump P is controlled to charge the fluid passage 10k with the operating fluid which is released from front left wheel cylinder 4a to internal reservoir 16.

Under a condition of automatic braking control, such as a condition of vehicle behavior stabilizing control, outlet gate valves 11 and 21 are closed and inlet gate valves 17 and 27 are opened. Simultaneously, hydraulic pump P is operated so that the operating fluid is supplied from master cylinder 2 through suction passages 10g, 10h, 20g and 20h, hydraulic pump P, and discharge passages 10i and 20i to fluid passages 10k and 20k. Moreover, outlet gate valves 11 and 21 or pressure-increasing valves 12, 13, 22 and 23 are controlled so as to conform the wheel cylinder pressures Pwc to desired pressure values needed to produce a desired braking force.

(Amplification Control by Wheel Cylinder Pressure Control Mechanism)

In general, when a brake pedal is depressed by a driver, then a master cylinder generates a hydraulic pressure in accordance with depression of the brake pedal. In order to boost or amplify a depressing force applied to the brake pedal (corresponding to the thrust of input rod 6), or in order to produce a higher master cylinder pressure, the brake system includes a booster system (corresponding to master cylinder pressure control mechanism 5 and master cylinder pressure controller 8). When the booster system is failed, then it becomes impossible to boost the depressing force or amplify the master cylinder pressure.

The function of the booster system may be implemented by achieving a condition that wheel cylinder pressures are raised higher compared to the master cylinder pressure generated by the depressing force of the driver. In the embodiment, the brake control apparatus sets desired wheel cylinder pressures higher with respect to the master cylinder pressure, and controls wheel cylinders in accordance with the desired wheel cylinder pressures, in order to implement the function of the booster system, when the booster system is failed. Specifically, brake control apparatus 1 controls outlet gate valves 11 and 21 in wheel cylinder pressure control mechanism 3 when in backup modes 1 and 2 which are described in detail below.

The following describes how wheel cylinder pressure control mechanism 3 implements a function of amplification control. In wheel cylinder pressure control mechanism 3, hydraulic pumps P1 and P2, inlet gate valves 17 and 27, and outlet gate valves 11 and 21 are controlled in order to implement the function of amplification control. Specifically, outlet gate valves 11 and 21 are controlled by differential pressure control under condition that inlet gate valves 17 and 27 are opened and hydraulic pump P is driven by electric motor M so as to supply a hydraulic pressure. The following describes hydraulic circuit section 10 in detail, which is the same as in hydraulic circuit section 20.

(Control of Outlet Gate Valve)

Outlet gate valve 11 includes a coil for inducing an electromagnetic attractive force, a movable member moved by the electromagnetic attractive force for adjusting a valve opening, and a valve body hydraulically connected to upstream and downstream portions of fluid passages 10k.

The movable member of outlet gate valve 11 is subject to a force "Fwc" resulting from a hydraulic pressure on the side closer to front left and rear right wheel cylinders 4a and 4d and acting in a direction to increase the valve opening, a force "Fmc" resulting from the master cylinder pressure Pmc and acting in a direction to reduce the valve opening, and an electromagnetic attractive force "Fb" acting in the direction to reduce the valve opening. Although outlet gate valve 11 is a normally open valve, and outlet gate valve 11 is actually subject to a force of a return spring which is acting in the direction to increase the valve opening, such a force is neglected. When it is necessary to take it into consideration, an offset value is added in the following discussion.

The movable member of outlet gate valve 11 is stationary, when the three external forces are in balance or cancelled by each other. Specifically, the movable member is stationary, when $Fmc+Fb-Fwc=0$ (or $Fb=Fwc-Fmc$); the movable member moves in the direction to reduce the valve opening, when $Fmc+Fb-Fwc>0$ (or $Fb>Fwc-Fmc$); and the movable member moves in the direction to increase the valve opening, when $Fmc+Fb-Fwc<0$ (or $Fb<Fwc-Fmc$). Since the force Fmc is proportional to the master cylinder pressure Pmc, and the force Fwc is proportional to the wheel cylinder pressure Pwc, a differential pressure $\Delta P$ between the master cylinder pressure Pmc and the wheel cylinder pressure Pwc is in correlation with $(Fwc-Fmc)$. On the other hand, the position of the movable member depends on the relationship between Fb and $(Fwc-Fmc)$. Therefore, the differential pressure $\Delta P$ can be achieved by setting the electromagnetic attractive force Fb equal to the value of $(Fwc-Fmc)$ corresponding to differential pressure ΔP, and allowing the movable member to move to attain the differential pressure ΔP.

A desired differential pressure ΔP* is set on the basis of the master cylinder pressure Pmc measured by master cylinder pressure sensors 3a and 3b, and a desired amplification factor α*. The desired differential pressure ΔP* may be set on the basis of the amount of operation of brake pedal BP which is measured by brake operation sensor 7, and sent from brake operation sensor 7 through master cylinder pressure controller 8 to wheel cylinder pressure controller 9.

In order to implement the function of amplification control by wheel cylinder pressure control mechanism 3, the wheel cylinder pressure Pwc is controlled to be higher than the master cylinder pressure Pmc by operating the first hydraulic pump P1 so as to generate a high hydraulic pressure on the downstream side of outlet gate valve 11. At the time, the desired wheel cylinder pressure Pwc* can be attained by setting the electromagnetic attractive force Fb equivalent to the desired differential pressure ΔP*, and allowing the movable member of outlet gate valve 11 to move automatically. For example, when the wheel cylinder pressure Pwc is higher than the desired value, then the movable member automatically moves in the direction to increase the valve opening, so that the operating fluid is drained from front left and rear right wheel cylinders 4a and 4d to master cylinder 2 so as to reduce the wheel cylinder pressure Pwc until the desired differential pressure ΔP* is attained. In this way, the wheel cylinder pressure Pwc is automatically controlled to a desired value with a mechanical feedback, without a feedback from a sensor for sensing the wheel cylinder pressure Pwc.

The foregoing amplification control requires no complicated feedback control system. Even if there are errors in control of electric motor M, such errors can be cancelled by operation of outlet gate valve 11. In other words, outlet gate valve 11 attains the desired differential pressure ΔP* with a mechanical feedback, when the electromagnetic attractive force Fb is set equivalent to desired differential pressure ΔP* in a feedforward-like manner on the basis of the master cylinder pressure Pmc corresponding to the depressing force applied to brake pedal BP. Accordingly, the control system requires no sensor for sensing a state of a control target, which is required for constructing an electronic feedback control system. In this way, the control system is much stable.

(Motor Drive Control)

Basically, inlet gate valve 17 is opened and first hydraulic pump P1 is driven, while outlet gate valve 11 is controlled to implement the foregoing amplification control. First hydraulic pump P1 is driven by electric motor M. Electric motor M is controlled so as to rotate at a speed that is minimum for attaining the desired wheel cylinder pressure Pwc* which is amplified based on the master cylinder pressure Pmc. Thus, first hydraulic pump P1 can supply a required hydraulic pressure and allow the wheel cylinder pressures Pwc to be controlled as desired.

First hydraulic pump P1 receives the operating fluid through suction passages 10g and 10h and discharges it to front left and rear right wheel cylinders 4a and 4d. Hence, no stroke simulator is required to allow the stroke of brake pedal BP.

For the above amplification control, measurement by the sensors is unessential other than measurement of the master cylinder pressure Pmc. Accordingly, brake control apparatus 1 can implement the amplification control, even when brake operation sensor 7 is failed. In other words, the backup modes 1 and 2 can be employed, even when brake operation sensor 7 is failed, as described in detail below.

Master Cylinder Pressure Control Mechanism

The following describes the construction and operations of master cylinder pressure control mechanism 5. Electric motor 50 is a three-phase DC brush less motor, and is operated by an electric power supplied in accordance with a control signal outputted from master cylinder pressure controller 8, so as to generate a desired torque.

Speed reducer 51 reduces the output rotational speed of electric motor 50 through a pulley system. Speed reducer 51 includes a driving pulley 52, a driven pulley 53, and a belt 54. Driving pulley 52 has a smaller outer diameter, and is connected to the output shaft of electric motor 50. Driven pulley 53 has a larger outer diameter, and is connected to a ball screw nut 56 of a rotation-translation converter 55. Belt 54 is wound around driving and driven pulleys 52 and 53. Speed reducer 51 amplifies the torque according to a reduction ratio which is a ratio between diameters of driving and driven pulleys 52 and 53, and transmits the increased torque to rotation-translation converter 55.

If electric motor 50 can output a sufficiently large torque so that torque amplification based on speed reduction is unnecessary, then electric motor 50 may be directly connected to rotation-translation converter 55 without speed reducer 51. This eliminates problems caused by the provision of speed reducer 51 in terms of reliability, noise, and mountability.

Rotation-translation converter 55 converts the torque generated by electric motor 50 into a linear thrust applied to primary piston 2b in the positive x-axis direction. In the embodiment, rotation-translation converter 55 includes a ball-screw motion converter. Specifically, rotation-translation converter 55 includes a ball screw nut 56, a ball screw shaft 57, a contact plate 58 and a return spring 59.

The cylinder section 2a of master cylinder 2 is connected at its longitudinal end on the negative-x side to a first housing part "HSG1". First housing part HSG1 is connected at its longitudinal end on the negative-x side to a second housing part "HSG2". Ball screw nut 56 is disposed within second housing part HSG2, and supported through a bearing "BRG" relative to second housing part HSG2 for rotation about the longitudinal axis of ball screw nut 56. Driven pulley 53 is fit and fixed to the outer peripheral surface of a longitudinal end portion of ball screw nut 56 on the negative x side of ball screw nut 56. Ball screw shaft 57 is in the form of a hollow cylinder, and is screwed in a cylindrical hole of ball screw nut 56. A plurality of balls are disposed for rolling movement in a space defined between a groove defined in ball screw nut 56 and a groove defined in ball screw shaft 57.

Contact plate 58 is fixed to a longitudinal end of ball screw shaft 57 on the positive x side of ball screw shaft 57. The longitudinal end surface of contact plate 58 which faces in the positive x-axis direction is joined with primary piston 2b. Primary piston 2b is housed in first housing part HSG1. Primary piston 2b includes a longitudinal end portion on the positive x side which extends from first housing part HSG1 and is rotatably fit in cylinder section 2a of master cylinder 2.

Return spring 59 is disposed around primary piston 2b in first housing part HSG1. Return spring 59 includes a first longitudinal end fixed to a bottom surface "A" of first housing part HSG1, and a second longitudinal end fit and fixed to contact plate 58, where the first longitudinal end faces in the positive x-axis direction, the bottom surface A faces in the negative x-axis direction, and the second longitudinal end faces in the negative x-axis direction. Return spring 59 is compressed in the x-axis direction between surface A and contact plate 58, biasing the contact plate 58 and ball screw shaft 57 in the negative x-axis direction relative to first housing part HSG1.

When ball screw nut 56 rotates as a unit with driven pulley 53, then the rotation causes ball screw shaft 57 to move in the x-axis direction. The thrust for the movement of ball screw shaft 57 in the positive x-axis direction presses primary piston 2b in the positive x-axis direction through contact plate 58.

On the other hand, the elastic force of return spring 59 is applied to ball screw shaft 57 in the negative x-axis direction. FIG. 1 shows a state in which ball screw shaft 57 is maximally displaced in the negative x-axis direction, and located in an initial position, under condition of no operation of brake pedal BP. Even if a failure occurs to de-energize electric motor 50 and disable electric motor 50 from moving back the ball screw shaft 57 in the negative x-axis direction during braking operation, i.e. while primary piston 2b is pressed in the positive x-axis direction so as to increase the master cylinder pressure Pmc, the elastic force of return spring 59 brings the ball screw shaft 57 into the initial position. Accordingly, the master cylinder pressure Pmc decreases close to zero. This prevents the braking force from being undesirably kept, and thereby prevents the vehicle behavior from falling unstable.

A pair of springs 6d and 6e are arranged in series in an annular space "B" defined between input rod 6 and primary piston 2b. Spring 6d is fixedly mounted at one longitudinal end to a flange 6c formed around input rod 6, and at the other longitudinal end to division wall 2h which defines primary fluid chamber 2d. Spring 6e is fixedly mounted at one longitudinal end to flange 6c of input rod 6, and at the other longitudinal end to contact plate 58. Springs 6d and 6e bias input rod 6 into a neutral position with respect to primary piston 2b, and serve to hold input rod 6 in the neutral position with respect to primary piston 2b under condition of no braking operation. When input rod 6 is displaced from the neutral position relative to primary piston 2b, then springs 6d and 6e bias input rod 6 to the neutral position relative to primary piston 2b.

Electric motor 50 is provided with a rotation sensor 50a for outputting a sensing signal to master cylinder pressure controller 8, where the sensing signal is indicative of a rotational position of the output shaft of electric motor 50. On the basis of the sensing signal, master cylinder pressure controller 8 determines the rotation angle of electric motor 50, and computes the amount of travel of rotation-translation converter 55, or the displacement of primary piston 2b in the x-axis direction.

Electric motor 50 is also provided with a temperature sensor 50b for outputting a sensing signal to master cylinder pressure controller 8, where the sensing signal is indicative of a temperature of electric motor 50.

(Process of Amplification Control)

The following describes how master cylinder pressure controller 8 amplifies the thrust of input rod 6 by master cylinder pressure control mechanism 5.

Master cylinder pressure controller 8 with master cylinder pressure control mechanism 5 displaces primary piston 2b in accordance with the displacement of input rod 6 which is made by operation of brake pedal BP. The thrusts of input rod 6 and primary piston 2b pressurizes primary fluid chamber 2d so as to change the master cylinder pressure Pmc. The thrust of input rod 6 is thus amplified. The amplification factor α depends on a ratio between cross-sectional areas of input rod 6 and primary piston 2b in primary fluid chamber 2d.

The master cylinder pressure Pmc is determined under condition that the forces are in balance as expressed by equation (1).

$$Pmc=(F_{IR}+K\cdot\Delta x)/A_{IR}=(F_{PP}-K\cdot\Delta x)/A_{PP} \quad (1)$$

where:

Pmc represents the hydraulic pressure in primary fluid chamber 2d (master cylinder pressure);

$F_{IR}$ represents the thrust of input rod 6;

$F_{PP}$ represents the thrust of primary piston 2b;

$A_{IR}$ represents the pressure-receiving area of input rod 6;

$A_{PP}$ represents the pressure-receiving area of primary piston 2b;

K represents a spring constant of spring 6d or 6e; and $\Delta x$ represents the relative displacement between input rod 6 and primary piston 2b.

The relative displacement $\Delta x$ is defined as $\Delta x=x_{PP}-x_{IR}$ where $x_{IR}$ represents a displacement of input rod 6, and $x_{PP}$ represents a displacement of primary piston 2b. The relative displacement $\Delta x$ is equal to zero, when primary piston 2b is in a neutral position respect to input rod 6, is positive, when primary piston 2b is advanced from input rod 6 in the positive x-axis direction, and is negative, when input rod 6 is advanced from primary piston 2b. In equation (1), the friction between input rod 6 and the sealing is neglected. The thrust of primary piston 2b, $F_{PP}$, can be estimated based on the magnitude of the drive current of electric motor 50.

On the other hand, the amplification factor α is expressed by equation (2).

$$\alpha=Pmc\cdot(A_{IR}+A_{PP})/F_{IR} \quad (2)$$

When equation (2) is substituted into equation (1), equation (3) is obtained which expresses the amplification factor α.

$$\alpha=(1+K\cdot\Delta x/F_{IR})(A_{IR}+A_{PP})/A_{IR} \quad (3)$$

In the amplification control, in order to attain desired characteristics of the master cylinder pressure Pmc with respect to the displacement $x_{IR}$ of input rod 6, electric motor 50 (or the displacement $x_{PP}$ of primary piston 2b) is controlled. On the basis of the desired characteristics of the master cylinder pressure Pmc with respect to the displacement $x_{IR}$ of input rod 6, desired characteristics of the displacement $x_{PP}$ of primary piston 2b with respect to the displacement $x_{IR}$ of input rod 6 is determined, and accordingly, desired characteristics of the relative displacement $\Delta x$ with respect to the displacement $x_{IR}$ of input rod 6 is determined, experimentally or theoretically. A desired relative displacement $\Delta x^*$ is computed based on the desired characteristics of the relative displacement $\Delta x$ with respect to the displacement $x_{IR}$. That is, a value of the desired relative displacement $\Delta x^*$ is computed in accordance with a value of the displacement $x_{IR}$ of input rod 6.

When rotation of electric motor 50 (or the displacement $x_{PP}$ of primary piston 2b) is controlled so as to attain the desired relative displacement $\Delta x^*$ which is determined in accordance with the measured displacement $x_{IR}$ of input rod 6, then the master cylinder pressure Pmc corresponding to the desired relative displacement $\Delta x^*$ builds up in master cylinder 2.

The displacement $x_{IR}$ of input rod 6 is measured by brake operation sensor 7, the displacement $x_{PP}$ of primary piston 2b is measured or computed based on the signal from rotation sensor 50a, and the relative displacement $\Delta x$ is computed as a difference between the two measured values. The amplification control is implemented by setting the desired relative displacement $\Delta x^*$ based on the displacement $x_{IR}$ and the desired characteristics of change, and controlling the electric motor 50 by feedback control so as to conform the measured relative displacement Δx to the desired relative displacement Δx*. An additional stroke sensor may be provided to directly measure the displacement $x_{PP}$ of primary piston 2b.

In this way, the amplification control is implemented with no expensive depressing force sensor, resulting in a cost reduction. The amplification factor α can be arbitrarily changed (increased or reduced) from the ratio of pressure-receiving areas $(A_{IR}+A_{PP})/A_{IR}$ by controlling the electric motor 50 so as to set the relative displacement Δx suitably.

In order to hold the amplification factor α constant, primary piston 2b is moved as a unit with input rod 6. That is, electric motor 50 is controlled so as to keep the relative displacement Δx=0. With Δx=0, the amplification factor α is equal to $(A_{IR}+A_{PP})/A_{IR}$, which is derived from equation (3). The constant amplification control is implemented by setting $A_{IR}$ and $A_{PP}$ so as to attain a desired value of the amplification factor α, and controlling the primary piston 2b so as to conform the displacement $x_{PP}$ to the displacement $x_{IR}$ of input rod 6, and thereby hold the amplification factor α constant.

According to the above constant amplification control, the master cylinder pressure Pmc increases with respect to the displacement of input rod 6 along a curve of second order, a curve of third order, or a curve of higher order.

On the other hand, a variable amplification control is implemented by setting the desired relative displacement Δx* equal to a positive value, and controlling the electric motor 50 so as to attain the desired relative displacement Δx*. When input rod 6 travels in the direction to increase the master cylinder pressure Pmc, then the displacement $x_{PP}$ of primary piston 2b is controlled to be constantly larger than the displacement $x_{IR}$ of input rod 6. According to equation (3), the amplification factor α is increased by the factor of $(1+K \cdot \Delta x/F_{IR})$. In this way, master cylinder pressure control mechanism 5 serves as an amplifier capable of varying the amplification factor α in accordance with the relative displacement Δx, and reducing the depressing force of brake pedal BP, while generating a braking force as requested by a driver.

In view of controllability, it is preferable that the gain $(1+K \cdot \Delta x/F_{IR})$ is equal to 1. However, the gain $(1+K \cdot \Delta x/F_{IR})$ may be changed temporarily above 1, in order to control the braking force to be higher than the level of driver's braking operation, for example, when an urgent braking operation is requested. The gain $(1+K \cdot \Delta x/F_{IR})$ above 1 produces a large braking force than requested by the driver. Such an urgent braking operation may be employed, when the rate of change of the value detected by brake operation sensor 7 is high above a predetermined threshold value.

The variable amplification control is implemented by controlling the electric motor 50 so as to increase the relative displacement Δx as input rod 6 moves in the positive x-axis direction, and thereby increase the master cylinder pressure Pmc more quickly than in the constant amplification control.

In the above variable amplification control, the rate of change of the master cylinder pressure Pmc with respect to the displacement of input rod 6 is higher than in the constant amplification control. Accordingly, the displacement $x_{PP}$ of primary piston 2b is set to increase more quickly than the displacement $x_{IR}$ of input rod 6. In summary, the desired relative displacement Δx* is increased at a predetermined rate of change, as the displacement $x_{IR}$ of input rod 6 increases.

The variable amplification control may include a temporal operation in which electric motor 50 is controlled so as to set the displacement $x_{PP}$ of master cylinder 2 smaller than the displacement $x_{IR}$ of input rod 6 when input rod 6 moves in the direction to increase the master cylinder pressure Pmc. This operation may be employed for a hybrid electric vehicle, when a regenerative braking force is produced in the hybrid electric vehicle, and the hydraulic braking is reduced by the amount of the regenerative braking force.

Although the above amplification control is implemented by controlling the relative displacement Δx as a controlled variable, the amplification control may be implemented by measuring the master cylinder pressure Pmc by master cylinder pressure sensors 3a and 3b, and controlling the master cylinder pressure control mechanism 5 (electric motor 50) by feedback control so as to conform the master cylinder pressure Pmc to a desired value. Brake control apparatus 1 may employ one of the control methods according to situations.

The amplification control based on the relative displacement Δx requires no measurement of the master cylinder pressure Pmc, as described above. However, as a failsafe function, the measured master cylinder pressure Pmc is compared with a desired value of the master cylinder pressure Pmc corresponding to the displacement $x_{IR}$, in order to check whether or not the master cylinder pressure Pmc is normal.

(Automatic Braking Control)

At the time of automatic braking control in which brake pedal BP is not operated and input rod 6 is not displaced, master cylinder pressure controller 8 automatically produces and controls the master cylinder pressure Pmc by master cylinder pressure control mechanism 5. In the automatic braking control, the displacement of primary piston 2b is controlled in order to conform the master cylinder pressure Pmc to a desired value. The automatic braking control may be employed for a vehicle behavior control, such as vehicle follow-up control, lane deviation prevention control, obstacle escaping control, etc. The desired value of the master cylinder pressure Pmc is computed on the basis of a desired braking force which is outputted from a controller provided for the vehicle behavior control.

The control of primary piston 2b for the automatic braking control may be implemented by using a stored table which defines a relationship between the displacement $x_{PP}$ of primary piston 2b and the master cylinder pressure Pmc, and deriving the displacement $x_{PP}$ as a target from the table so that the displacement $x_{PP}$ attains the desired value of the master cylinder pressure Pmc. Specifically, master cylinder pressure controller 8 converts the rotation angle of electric motor 50 into the displacement $x_{PP}$ of primary piston 2b, and controls electric motor 50 by feedback control so as to conform the displacement $x_{PP}$ to the desired displacement $x_{PP}$ determined above.

The master cylinder pressure Pmc may controlled by feedback control by adjusting the displacement $x_{PP}$ of primary piston 2b so as to conform the measured master cylinder pressure Pmc to the desired value for automatic braking. Master cylinder pressure controller 8 may receive information concerning the desired value for automatic braking from an external device.

The amplification control based on the table requires no measurement of the master cylinder pressure Pmc, as described above. However, as a failsafe function, the measured master cylinder pressure Pmc is compared with a desired value of the master cylinder pressure Pmc corresponding to the displacement $x_{IR}$, in order to check whether or not the master cylinder pressure Pmc is normal.

Electric Circuit of Master Cylinder Pressure System

Figure 2:
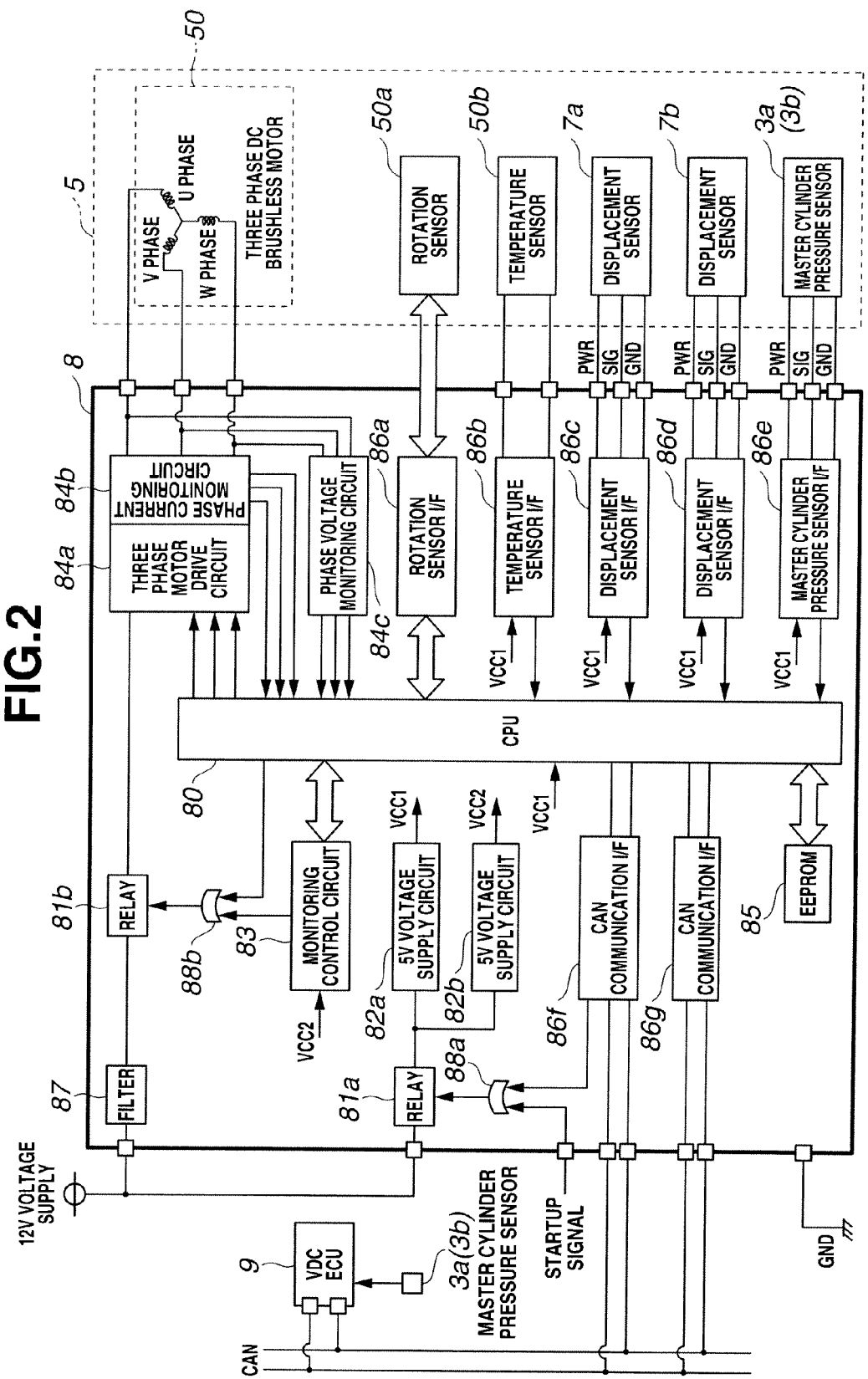
FIG. 2 is a schematic diagram showing an electric circuit of a master cylinder pressure control system in the brake control apparatus of FIG. 1.

FIG. 2 schematically shows an electric circuit of a master cylinder pressure control system in the brake control apparatus of FIG. 1. In FIG. 2, wheel cylinder pressure controller 9 is an electrical control unit (ECU) for vehicle dynamics control (VDC).

For example, a control system for VDC may be implemented by sensing the attitude of a vehicle by sensors, applying a braking torque to a front outside wheel during cornering when the vehicle is judged as in a state of oversteer, and applying a braking torque to a rear inside wheel during cornering with a reduction of engine power when the vehicle is judged as in a state of understeer.

Master cylinder pressure controller 8 includes a processor or central processing unit (CPU) 80, relay circuits 81a and 81b, 5V voltage supply circuits 82a and 82b, a monitoring control circuit 83, a driver (drive means) or three phase motor drive circuit 84a, a phase current monitoring circuit 84b, a phase voltage monitoring circuit 84c, a memory circuit 85, and interface circuits (I/F circuits) 86a, 86b, 86c, 86d, 86e, 86f and 86g.

A 12V voltage is supplied to master cylinder pressure controller 8 through an ECU power supply relay circuit 81a from a circuit mounted in the vehicle. The 12V voltage is supplied to 5V voltage supply circuits 82a and 82b. Each of 5V voltage supply circuits 82a and 82b supplies stable 5V voltages Vcc1 and Vcc2. 5V voltage Vcc1 is supplied to CPU 80, a temperature sensor interface circuit 86b, displacement sensor interface circuits 86c and 86d, and a master cylinder pressure sensor interface circuit 86e. 5V voltage Vcc2 is supplied to monitoring control circuit 83.

ECU power supply relay circuit 81a is turned on in response to a condition that startup signal output section 88a receives one of a predetermined startup signal (wakeup signal) from outside of master cylinder pressure controller 8 and a startup signal generated by CAN communication interface circuit 86f in response to a signal sent through CAN communication. The startup signal may be a door switch signal, a brake switch signal, or an ignition (IGN) switch signal. Master cylinder pressure controller 8 may receive all of the switch signals, and ECU power supply relay circuit 81a may be turned on when at least one of the switch signals is indicative of the ON-state.

The 12V voltage supplied from the power line in the vehicle is supplied through filter circuit 87 and failsafe relay circuit 81b to three phase motor drive circuit 84a, where filter circuit 87 removes noises. Failsafe relay circuit 81b is configured to selectively shut off connection between the 12V voltage source and three phase motor drive circuit 84a, and is turned on or off by CPU 80 and monitoring control circuit 83. Thus, failsafe relay circuit 81b selectively supplies or shuts off the 12V voltage to or from three phase motor drive circuit 84a. On-off signal output section 88b is configured to turn off failsafe relay circuit 81b in response to an off signal outputted from one of CPU 80 and monitoring control circuit 83.

CPU 80 receives from outside through CAN communication interface circuits 86f and 86g signals indicative of information concerning the vehicle, and desired hydraulic pressures for automatic braking. Also, CPU 80 receives signals from sensors including rotation sensor 50a, temperature sensor 50b, displacement sensors 7a and 7b, and master cylinder pressure sensors 3a and 3b, through rotation sensor interface circuit 86a, temperature sensor interface circuit 86b, displacement sensor interface circuits 86c and 86d and master cylinder pressure sensor interface circuit 86e.

The signals from master cylinder pressure sensors 3a and 3b are checked for comparing the measured master cylinder pressure Pmc with a desired master cylinder pressure during the variable amplification control based on the relative displacement Δx.

On the basis of the signals from the outside devices and the sensors, CPU 80 outputs suitable control signals to three phase motor drive circuit 84a connected to electric motor 50, for controlling the electric motor 50. Phase current monitoring circuit 84b and phase voltage monitoring circuit 84c is provided for each of the three phase outputs of three phase motor drive circuit 84a for monitoring the current and voltage for each phase. The monitored values are outputted to CPU 80, which controls three phase motor drive circuit 84a on the basis of the monitored values.

In this way, CPU 80 controls master cylinder pressure control mechanism 5 (electric motor 50) on the basis of the information concerning the current state of master cylinder pressure control mechanism 5. When the monitored values are out of normal ranges, or when electric motor 50 does not correctly operate according to the control signal from CPU 80, then CPU 80 detects or identifies malfunctions or abnormalities with master cylinder pressure control mechanism 5.

Monitoring control circuit 83 receives and sends signals from and to CPU 80, for monitoring failures in CPU 80, 5V voltage supply circuit 82a, and 5V voltage source Vcc1. When detecting a failure, monitoring control circuit 83 quickly outputs a signal to failsafe relay circuit 81b so as to turn off failsafe relay circuit 81b, and shutoff electric power supply to three phase motor drive circuit 84a.

On the other hand, CPU 80 monitors failures in monitoring control circuit 83, 5V voltage supply circuit 82b, and 5V voltage source Vcc2.

Memory circuit 85 is an EEPROM (Electrically Erasable and Programmable Read Only Memory) for receiving and sending signals from and to CPU 80. For example, memory circuit 85 stores information concerning failures. CPU 80 allows memory circuit 85 to store information concerning failures, values obtained by learning (control gains, offset values for sensors, etc.) which are used in the control of master cylinder pressure control mechanism 5.

Control Process of Brake Control Apparatus

Figure 3:
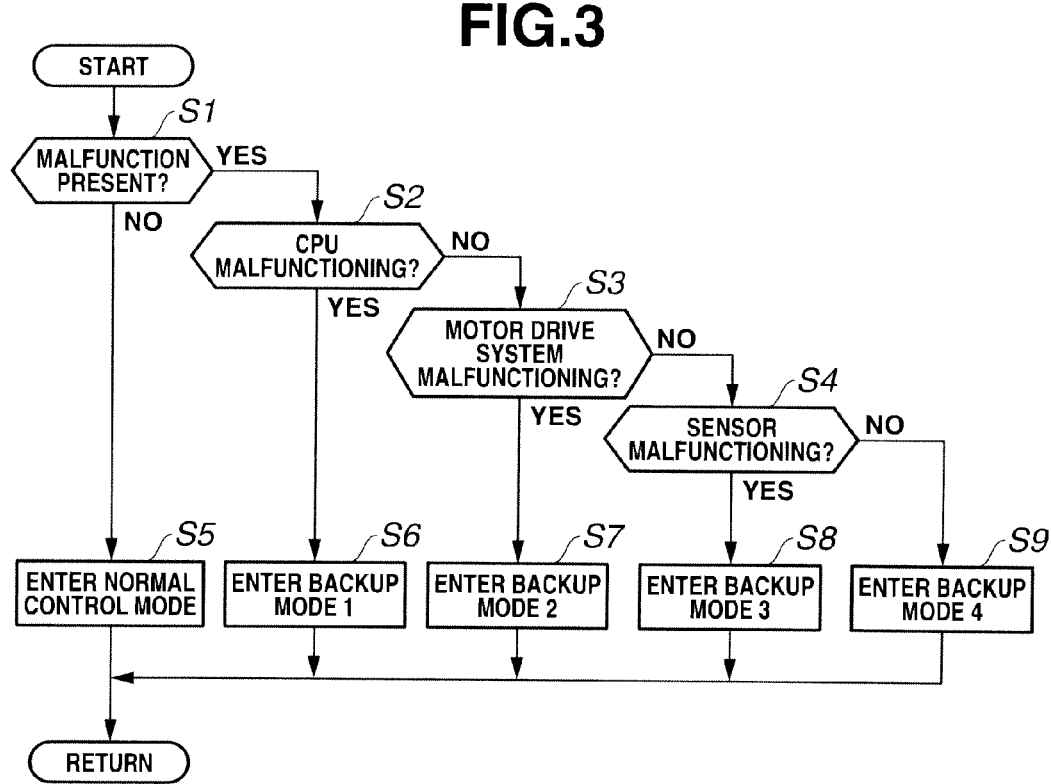
FIG. 3 is a flow chart showing a control process for handling malfunctions in the master cylinder pressure control system of FIG. 2.

FIG. 3 is a flow chart showing a control process for handling malfunctions in the master cylinder pressure control system of FIG. 2, which is performed by brake control apparatus 1.

At Step S1, brake control apparatus 1 (specifically, CPU 80 or monitoring control circuit 83) determines whether or not a malfunction is present. When the answer to Step S1 is negative (NO), i.e. no malfunction is present, then brake control apparatus 1 proceeds to Step S5 at which brake control apparatus 1 continues to perform a normal braking control in a normal control mode. When the answer to Step S1 is affirmative (YES), i.e. at least one malfunction is detected by CPU 80 or monitoring control circuit 83, then brake control apparatus 1 proceeds to Step S2. Brake control apparatus 1 identifies the present malfunction at Step S2 to S4, and select one of backup modes at Steps S6 to S9 in accordance with the identification of the malfunction.

At Step S2, brake control apparatus 1 determines whether or not CPU 80 is in a state of malfunction. Specifically, monitoring control circuit 83 monitors a state of CPU 80 through bidirectional communication, and determines whether or not CPU 80 is in a state of malfunction. The state of malfunction is not limited to a state in which a malfunction is present in CPU 80, but includes a state in which a malfunction is present in 5V voltage supply circuit 82b and 5V voltage source Vcc1 which supply electric power to CPU 80.

(Backup Mode 1)

When the answer to Step S2 is YES, i.e. when CPU 80 is in a state of malfunction, then brake control apparatus 1 proceeds to Step S6 at which brake control apparatus 1 enters the backup mode 1. When in the backup mode 1, monitoring control circuit 83 shuts off electric power supply to three phase motor drive circuit 84a by turning off the failsafe relay circuit 81b. Master cylinder pressure controller 8 sends information concerning the selection of the backup mode 1 and the fact that CPU 80 is in the state of malfunction, to wheel cylinder pressure controller 9 through CAN communication interface circuits 86f and 86g. Brake control apparatus 1 warns the driver by allowing a warning lamp to light up or a buzzer to sound.

When receiving the information of the selection of the backup mode 1, then wheel cylinder pressure controller 9 enters a mode of amplification control in which wheel cylinder pressure controller 9 measures the amount of operation of brake pedal BP on the basis of the signals of master cylinder pressure sensors 3a and 3b, controls the inlet gate valves 17 and 27, outlet gate valves 11 and 21, and electric motor M in accordance with the measured amount of operation of brake pedal BP. Wheel cylinder pressure controller 9 may be differently configured to receive the signal from brake operation sensor 7, and measure the amount of operation of brake pedal BP on the basis of the signal from brake operation sensor 7.

When the answer to Step S2 is NO, then brake control apparatus 1 proceeds to Step S3. At Step S3, brake control apparatus 1 determines whether or not three phase motor drive circuit 84a is in a state of malfunction. The state of malfunction is not limited to a state in which a malfunction is present in three phase motor drive circuit 84a itself, but includes a state in which it is impossible to normally drive electric motor 50 when a malfunction is present in phase current monitoring circuit 84b, phase voltage monitoring circuit 84c, rotation sensor interface circuit 86a, rotation sensor 50a, electric motor 50, and lines connected between them. CPU 80 detects that three phase motor drive circuit 84a is in a state of malfunction, when at least one of the values of three-phase currents and voltages is out of a predetermined normal range, or when electric motor 50 does not correctly operate as controlled.

(Backup Mode 2)

When the answer to Step S3 is YES, i.e. when three phase motor drive circuit 84a is in a state of malfunction, then brake control apparatus 1 proceeds to Step S7 at which brake control apparatus 1 enters the backup mode 2. When in the backup mode 2, CPU 80 shuts off electric power supply to three phase motor drive circuit 84a by turning off the failsafe relay circuit 81b, thus stopping the control of electric motor 50. Master cylinder pressure controller 8 sends information concerning the selection of the backup mode 2 to wheel cylinder pressure controller 9 through CAN communication interface circuits 86f and 86g. Brake control apparatus 1 warns the driver by allowing the warning lamp to light up or the buzzer to sound.

When receiving the information of the selection of the backup mode 2, then wheel cylinder pressure controller 9 enters a mode of amplification control in which wheel cylinder pressure controller 9 measures the amount of operation of brake pedal BP on the basis of the signals of brake operation sensor 7 (displacement sensors 7a and 7b), controls the inlet gate valves 17 and 27, outlet gate valves 11 and 21, and electric motor M in accordance with the amount of operation of brake pedal BP. Wheel cylinder pressure controller 9 may be differently configured to receive the signal from master cylinder pressure sensors 3a and 3b, and measure the amount of operation of brake pedal BP on the basis of the signals from master cylinder pressure sensors 3a and 3b.

When the answer to Step S3 is NO, then brake control apparatus 1 proceeds to Step S4. At Step S4, brake control apparatus 1 determines whether or not the sensors are in a state of malfunction. The state of malfunction is not limited to a state in which a malfunction is present in displacement sensors 7a and 7b and master cylinder pressure sensors 3a and 3b, but includes a state in which it is impossible to normally use the sensors when a malfunction is present in displacement sensor interface circuits 86c and 86d, master cylinder pressure sensor interface circuit 86e, and lines connected between them. CPU 80 detects that the sensors are in a state of malfunction, when at least one of the signals inputted through the interface circuits and 5V voltage source Vcc1 is out of a predetermined normal range.

(Backup Mode 3)

Figure 4:
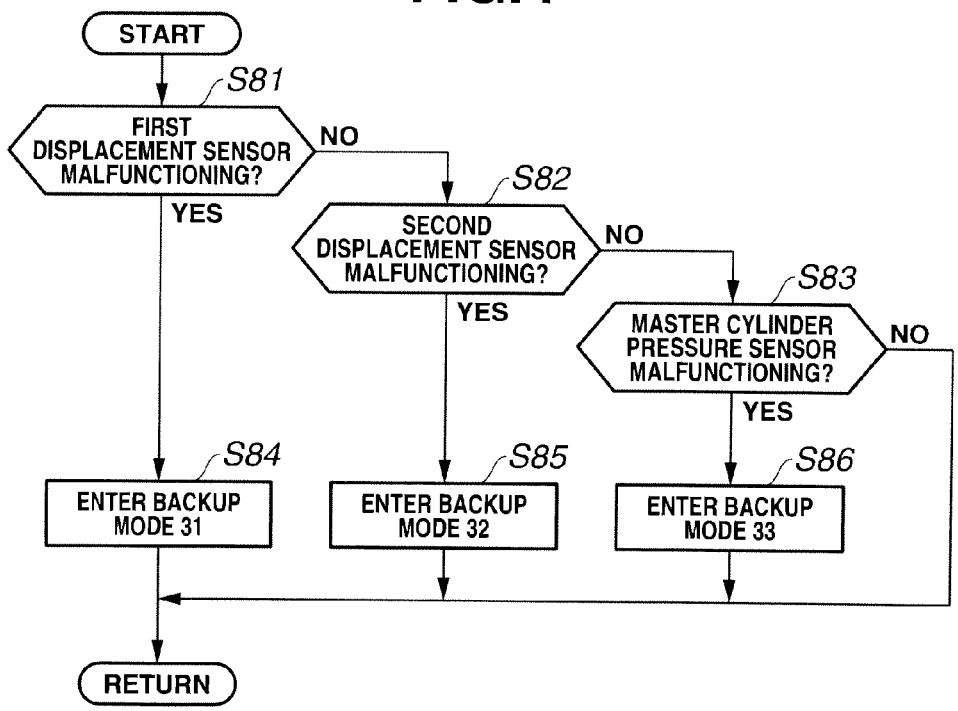
FIG. 4 is a flow chart showing a control process which is performed when a backup mode 3 is selected in the control process of FIG. 3.

When the answer to Step S4 is YES, i.e. when the sensors are in a state of malfunction, then brake control apparatus 1 proceeds to Step S8 at which brake control apparatus 1 enters a backup mode 3. FIG. 4 is a flow chart showing a control process which is performed when the backup mode 3 is selected in the control process of FIG. 3. During the control process of FIG. 4, brake control apparatus 1 judges which sensor is failed, and selects one of backup modes 31 to 33 in consideration of the states of the sensors.

At Step S81, brake control apparatus 1 judges whether or not displacement sensor 7a cannot be normally used. When the answer to Step S81 is YES, then brake control apparatus 1 proceeds to Step S84 at which brake control apparatus 1 enters the backup mode 31.

When in the backup mode 31, brake control apparatus 1 measures the operation of brake pedal BP using displacement sensor 7b without displacement sensor 7a. Except this point, brake control apparatus 1 performs as in the normal control mode. Moreover, brake control apparatus 1 warns the driver by allowing the warning lamp to light up or the buzzer to sound, and records the malfunction in memory circuit 85. Still moreover, master cylinder pressure controller 8 sends information of the malfunction of displacement sensor 7a to wheel cylinder pressure controller 9 or other external devices through CAN communication interface circuits 86f and 86g.

When the answer to Step S81 is NO, i.e. when displacement sensor 7a can be normally used, then brake control apparatus 1 proceeds to Step S82. At Step S82, brake control apparatus 1 judges whether or not displacement sensor 7a cannot be normally used. When the answer to Step S82 is YES, then brake control apparatus 1 proceeds to Step S85 at which brake control apparatus 1 enters the backup mode 32.

When in the backup mode 32, brake control apparatus 1 measures the operation of brake pedal BP using displacement sensor 7a without displacement sensor 7b. Except this point, the backup mode 32 is the same as the backup mode 31.

When the answer to Step S82 is NO, i.e. when displacement sensor 7b can be normally used, then brake control apparatus 1 proceeds to Step S83. At Step S83, brake control apparatus 1 judges whether or not master cylinder pressure sensors 3a and 3b cannot be normally used. When the answer to Step S83 is YES, then brake control apparatus 1 proceeds to Step S86 at which brake control apparatus 1 enters the backup mode 33.

When in the backup mode 33, brake control apparatus 1 inhibits controlling the master cylinder pressure control mechanism 5 by feedback control based on the master cylinder pressure Pmc which is measured by master cylinder pressure sensors 3a and 3b. Instead, brake control apparatus 1 controls master cylinder pressure control mechanism 5 by a process (a) or a process (b).

In the process (a), brake control apparatus 1 inhibits a feedback control based on the measured master cylinder pressure Pmc for automatic braking control. Brake control apparatus 1 determines a desired value of the displacement $x_{PP}$ of primary piston 2b using the stored relationship between the master cylinder pressure Pmc and the displacement $X_{PP}$, and conforms the displacement $x_{PP}$ to the desired value by feedback control, where the displacement $x_{PP}$ is measured based on the detected value of rotation sensor 50a.

In the process (b), brake control apparatus 1 inhibits the automatic braking control. As an amplification control, brake control apparatus 1 inhibits the variable amplification control and performs the constant amplification control in which the displacement $x_{PP}$ of primary piston 2b is controlled to be equal to the displacement $x_{IR}$ of input rod 6.

In the process (b), the feedback control based on the master cylinder pressure Pmc, the automatic braking control of the process (a), and the variable amplification control based on the relative displacement Δx are inhibited. This is because without the detection of the master cylinder pressure Pmc, the automatic braking control of the process (a), and the variable amplification control based on the relative displacement Δx does not provide the above-mentioned failsafe function based on the master cylinder pressure Pmc.

When in the backup mode 33, brake control apparatus 1 warns the driver by allowing the warning lamp to light up or the buzzer to sound, and records the malfunction in memory circuit 85. Moreover, master cylinder pressure controller 8 sends information of the malfunction of master cylinder pressure sensors 3a and 3b to wheel cylinder pressure controller 9 or other external devices through CAN communication interface circuits 86f and 86g.

When the answer to Step S4 is NO, i.e. when the sensors are not abnormal, then brake control apparatus 1 proceeds to Step S9 at which brake control apparatus 1 enters a backup mode 4. When in the backup mode 4, brake control apparatus 1 judges that master cylinder pressure controller 8 can continue to perform the normal control by master cylinder pressure controller 8, because no malfunction is identified at Step S2 to S4. Accordingly, brake control apparatus 1 warns the driver by allowing the warning lamp to light up or the buzzer to sound, and records the malfunction in memory circuit 85. Moreover, master cylinder pressure controller 8 sends information of the malfunction to wheel cylinder pressure controller 9 or other external devices through CAN communication interface circuits 86f and 86g.

(Time Chart)

Figure 5A:
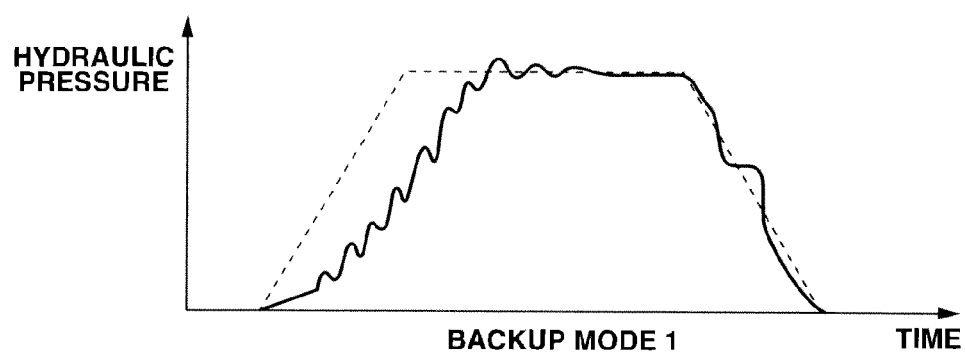
FIGS. 5A, 5B and 5C are time charts, where
Figure 5B:
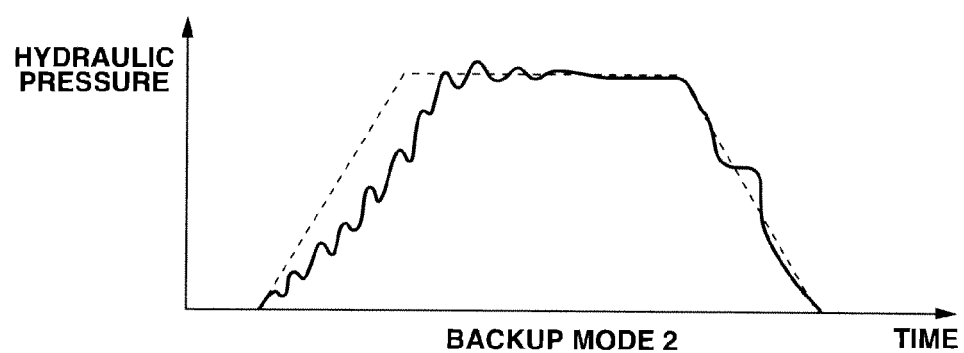
Figure 5C:
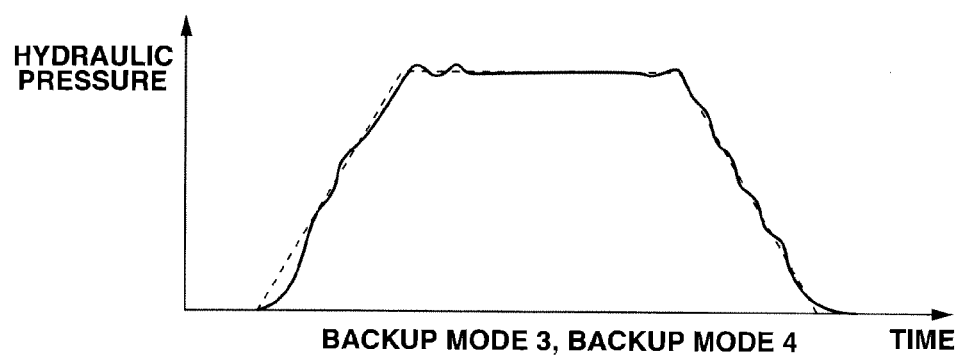

FIGS. 5A, 5B and 5C are time charts, where FIG. 5A shows an example of how a hydraulic pressure in the brake control apparatus of FIG. 1 changes with time when in the backup mode 1, FIG. 5B shows an example of how the hydraulic pressure changes with time when in the backup mode 2, and FIG. 5C shows an example of how the hydraulic pressure changes with time when in the backup mode 3 or the backup mode 4. The hydraulic pressure is measured between the section of outlet gate valves 11 and 21 and the section of wheel cylinders 4a, 4b, 4c and 4d. In FIGS. 5A, 5B and 5C, brake pedal BP is operated in the same way.

In both of the backup modes 1 and 2, the wheel cylinder pressures Pwc are controlled by wheel cylinder pressure control mechanism 3 without master cylinder pressure control mechanism 5. Accordingly, the curves in FIG. 5A are similar to the curves in FIG. 5B. However, the backup modes 1 and 2 employ different means for measuring the operation of brake pedal BP. Specifically, the backup mode 1 uses master cylinder pressure sensors 3a and 3b, while the backup mode 2 uses brake operation sensor 7 with the signal communication with master cylinder pressure controller 8.

In general, since the stroke of a brake pedal has an initial ineffective region, no master cylinder pressure occurs until the stroke of the brake pedal exceeds the initial ineffective region. Accordingly, a displacement sensor can detect an operation of the brake pedal more quickly than a master cylinder pressure sensor. Therefore, the backup mode 2, which employs the signal of brake operation sensor 7 (displacement sensors 7a and 7b), is superior in quickness of the response of the hydraulic pressure. Accordingly, the backup mode 2 shows a more preferable response of the hydraulic pressure with a more rapid rise than in the backup mode 1, as shown in FIGS. 5A and 5B.

The response of the hydraulic pressure in the backup mode 3 or 4 is superior in quickness, smoothness (smaller fluctuations), agreement with desired value, and any other points than in the backup mode 2. This is because the wheel cylinder pressures Pwc are controlled by wheel cylinder pressure control mechanism 3 in the backup mode 2, and the wheel cylinder pressures Pwc are controlled by regulating the master cylinder pressure Pmc by master cylinder pressure control mechanism 5 in the backup modes 3 and 4. In other words, the backup mode 3 or 4 employs the amplification control based on master cylinder 2, although the backup mode 2 employs the amplification control based on hydraulic pump P.

Advantageous Effects

Brake control apparatus 1 produces at least the following advantageous effects (1) to (16).

(1) A brake control apparatus (1) comprising: a master cylinder (2) arranged to raise an internal pressure (Pwc) of a wheel cylinder (4a, 4b, 4c, 4d) of a vehicle in accordance with operation of an input device (brake pedal BP) of the vehicle; a booster (master cylinder pressure control mechanism 5 as a boosting means) arranged to raise the internal pressure (Pwc) of the wheel cylinder (4a, 4b, 4c, 4d) by operating the master cylinder (2) independently of operation of the input device (brake pedal BP); a pressure regulator (wheel cylinder pressure control mechanism 3 as a pressure-regulating means) provided with a hydraulic pressure source (hydraulic pump P), and arranged to raise the internal pressure (Pwc) of the wheel cylinder (4a, 4b, 4c, 4d) independently of operation of the master cylinder (2); and a control section (master cylinder pressure controller 8, wheel cylinder pressure controller 9) including: a first controller (master cylinder pressure controller 8 as a first control means) connected for signal communication to the booster (master cylinder pressure control mechanism 5), and configured to control the booster (master cylinder pressure control mechanism 5); and a second controller (wheel cylinder pressure controller 9 as a second control means) connected for signal communication to the pressure regulator (wheel cylinder pressure control mechanism 3), and configured to control the pressure regulator (wheel cylinder pressure control mechanism 3), the control section (master cylinder pressure controller 8 and wheel cylinder pressure controller 9, as a means for detecting that at least one of the boosting means and the first control means is in a state of malfunction; as a means for selecting one of backup modes in accordance with the state of malfunction, wherein the backup modes restrict operation of the boosting means, and the backup modes include first and second backup modes; as a means for detecting that the processor is in a state of malfunction, and generating a first signal indicative of a request for the first backup mode in response to detecting that the processor is in a state of malfunction; as a means for detecting that the drive means is in a state of malfunction, and generating a second signal indicative of a request for the second backup mode in response to detecting that the drive means is in a state of malfunction; and as a means for controlling the internal pressure of the wheel cylinder by operating the pressure-regulating means in accordance with the measured amount of operation of the input device in response to generation of at least one of the first and second signals) being configured to: detect that at least one of the booster (master cylinder pressure control mechanism 5) and the first controller (master cylinder pressure controller 8) is in a state of malfunction (S1-S4, S81-S83); select one of backup modes in accordance with the state of malfunction, wherein the backup modes restrict operation of at least one of the booster (master cylinder pressure control mechanism 5) and the pressure regulator (wheel cylinder pressure control mechanism 3) in different manners (S6-S9, S84-S86); and control the internal pressure (Pwc) of the wheel cylinder (4a, 4b, 4c, 4d) in the selected backup mode, is effective for producing a suitable braking force as desired by a driver, even when the booster system is malfunctioning, and is advantageous in safety, ease of operation, and comfortability.

(2) The brake control apparatus further comprising a sensor (displacement sensors 7a and 7b, master cylinder pressure sensors 3a and 3b as a means for collecting information used to measure an amount of operation of the input device) arranged to collect information used to measure an amount of operation of the input device (brake pedal BP), wherein: the first controller (master cylinder pressure controller 8) includes: a processor (CPU 80); and a circuit (monitoring control circuit 83) configured to monitor a state of the processor (CPU 80); the first controller (master cylinder pressure controller 8) is configured to send to the second controller (wheel cylinder pressure controller 9) a signal indicative of a request for a backup mode in response to detecting that the processor (CPU 80) is in a state of malfunction; and the second controller (wheel cylinder pressure controller 9) is configured to control the internal pressure (Pwc) of the wheel cylinder (4a, 4b, 4c, 4d) by operating the pressure regulator (wheel cylinder pressure control mechanism 3) in accordance with the measured amount of operation of the input device (brake pedal BP) in response to receipt of the signal (in backup mode 1), is effective for producing a suitable braking force as desired by a driver, by operating the pressure regulator (wheel cylinder pressure control mechanism 3) instead of operation of the booster (master cylinder pressure control mechanism 5), even when the booster system is malfunctioning.

(3) The brake control apparatus wherein the input device includes a brake pedal (BP), and the sensor includes a stroke sensor (brake operation sensor 7) arranged to measure a stroke of the brake pedal (BP), is effective for quickly detecting the stroke of the brake pedal (BP), and achieving a more preferable response of the hydraulic pressure with a more rapid rise, as compared to the use of a master cylinder pressure sensor.

(4) The brake control apparatus wherein the sensor includes a master cylinder pressure sensor (3a, 3b) arranged to measure an internal pressure (Pmc) of the master cylinder (2), is effective for implementing an amplification control by controlling the pressure regulator (wheel cylinder pressure control mechanism 3) on the basis of the master cylinder pressure Pmc, even when the stroke sensor (brake operation sensor 7) is failed, and measuring precisely the operation of the brake pedal (BP) on the basis of the signal of the master cylinder pressure sensor (3a, 3b) for precise control of the hydraulic pressures, because the master cylinder pressure sensor (3a, 3b) indicates a large rate of change of a sensor value with respect to the stroke of the brake pedal (BP) than a displacement sensor after the stroke of the brake pedal (BP) exceeds the initial ineffective region so as to start to generate a master cylinder pressure.

(5) The brake control apparatus further comprising a sensor (displacement sensors 7a and 7b, master cylinder pressure sensors 3a and 3b) arranged to collect information used to measure an amount of operation of the input device (brake pedal BP), wherein: the booster (master cylinder pressure control mechanism 5) includes an electric motor (50) arranged to operate the master cylinder (2); the first controller (master cylinder pressure controller 8) includes: a driver (three phase motor drive circuit 84a) configured to drive the electric motor (50); and a circuit (phase current monitoring circuit 84b, phase voltage monitoring circuit 84c) configured to monitor a state of the driver (three phase motor drive circuit 84a); the first controller (master cylinder pressure controller 8) is configured to send to the second controller (wheel cylinder pressure controller 9) a signal indicative of a request for a backup mode in response to detecting that the driver (three phase motor drive circuit 84a) is in a state of malfunction; and the second controller (wheel cylinder pressure controller 9) is configured to control the internal pressure (Pwc) of the wheel cylinder (4a, 4b, 4c, 4d) by operating the pressure regulator (wheel cylinder pressure control mechanism 3) in accordance with the measured amount of operation of the input device (brake pedal BP) in response to receipt of the signal (in backup mode 2), is effective for generating a suitable braking force as requested by a driver, by operating the pressure regulator (wheel cylinder pressure control mechanism 3) instead of operation of the booster (master cylinder pressure control mechanism 5), even when electric motor 50 cannot be normally controlled.

(6) The brake control apparatus wherein the master cylinder (2) includes a piston (primary piston 2b) arranged to raise an internal pressure (Pmc) of the master cylinder (2), and the booster (master cylinder pressure control mechanism 5) includes a mechanism (rotation-translation converter 55) arranged to move the piston (primary piston 2b) of the master cylinder (2) by transmitting an output torque of the electric motor (50) to the piston (primary piston 2b), is effective for producing a suitable braking force as desired by a driver, even when the electric motor (50) in the booster (master cylinder pressure control mechanism 5) is malfunctioning, and is advantageous in safety, ease of operation, and comfortability.

(7) The brake control apparatus further comprising a plurality of sensors (displacement sensors 7a and 7b, master cylinder pressure sensors 3a and 3b) arranged to collect information used to measure an amount of operation of the input device (brake pedal BP), wherein the first controller (master cylinder pressure controller 8) is configured to: detect that at least one of the sensors (displacement sensors 7a and 7b, master cylinder pressure sensors 3a and 3b) is in a state of malfunction; and control the internal pressure (Pwc) of the wheel cylinder (4a, 4b, 4c, 4d) by operating the booster (master cylinder pressure control mechanism 5) in accordance with an output of a normal set of the sensors (displacement sensors 7a and 7b, master cylinder pressure sensors 3a and 3b) in response to detecting that at least one of the sensors (displacement sensors 7a and 7b, master cylinder pressure sensors 3a and 3b) is in a state of malfunction (in backup mode 31, backup mode 32), is effective for producing a suitable braking force as desired by a driver, by continuing to operate the booster (master cylinder pressure control mechanism 5), even when at least one of the sensors (displacement sensors 7a and 7b, master cylinder pressure sensors 3a and 3b) is malfunctioning.

(8) The brake control apparatus wherein the input device includes a brake pedal (BP), and the sensors include a plurality of stroke sensors (7a, 7b) arranged to measure a stroke of the brake pedal (BP), is effective for improving the failsafe feature of brake control apparatus 1.

(9) The brake control apparatus wherein: the master cylinder (2) includes a piston (primary piston 2b) arranged to raise an internal pressure (Pmc) of the master cylinder (2); the sensors include a master cylinder pressure sensor (3a, 3b) arranged to measure an internal pressure (Pmc) of the master cylinder (2); the booster (master cylinder pressure control mechanism 5) includes an electric motor (50) arranged to operate the master cylinder (2); the control section (master cylinder pressure controller 8, wheel cylinder pressure controller 9) is configured to: set a desired displacement ($x_{PP}^*$) of the piston (primary piston 2b) of the master cylinder (2) in accordance with a desired value of the internal pressure (Pmc) of the master cylinder (2); and estimate an actual displacement ($x_{PP}$) of the piston (2b) of the master cylinder (2) in accordance with an amount of rotation of the electric motor (50); and the first controller (master cylinder pressure controller 8) is configured to: detect that the master cylinder pressure sensor (3a, 3b) is in a state of malfunction; and control the internal pressure (Pwc) of the wheel cylinder (4a, 4b, 4c, 4d) by operating the booster (master cylinder pressure control mechanism 5) so as to conform the estimated actual displacement ($x_{PP}$) of the piston (primary piston 2b) to the desired displacement ($x_{PP}^*$) independently of operation of the input device (brake pedal BP) under control of automatic braking, in response to detecting that the master cylinder pressure sensor (3a, 3b) is in a state of malfunction (in backup mode 33), is effective for producing a suitable braking force as desired by a driver, by continuing to operate the booster (master cylinder pressure control mechanism 5), under control of automatic braking, even when the master cylinder pressure sensor (3a, 3b) is malfunctioning.

(10) The brake control apparatus wherein: the master cylinder (2) includes a piston (primary piston 2b) arranged to raise an internal pressure (Pmc) of the master cylinder (2); the sensors include a master cylinder pressure sensor (3a, 3b) arranged to measure an internal pressure (Pmc) of the master cylinder (2); the booster (master cylinder pressure control mechanism 5) includes an electric motor (50) arranged to operate the master cylinder (2); the control section (master cylinder pressure controller 8, wheel cylinder pressure controller 9) is configured to: set a desired displacement ($x_{PP}$) of the piston (primary piston 2b) of the master cylinder (2) in accordance with a desired value of the internal pressure (Pmc) of the master cylinder (2); and estimate an actual displacement ($x_{PP}$) of the piston (primary piston 2b) of the master cylinder (2) in accordance with an amount of rotation of the electric motor (50); and the first controller (master cylinder pressure controller 8) is configured to: detect that the master cylinder pressure sensor (3a, 3b) is in a state of malfunction; and control the internal pressure (Pwc) of the wheel cylinder (4a, 4b, 4c, 4d) by adjusting the displacement of the piston (primary piston 2b) by the booster (master cylinder pressure control mechanism 5) in accordance with the measured stroke of the brake pedal (BP) so as to raise the internal pressure (Pmc) of the master cylinder (2) by a constant amplification factor, in response to detecting that the master cylinder pressure sensor (3a, 3b) is in a state of malfunction (in backup mode 33), is effective for producing a suitable braking force as desired by a driver, by continuing to operate the booster (master cylinder pressure control mechanism 5), with an improved failsafe feature, even when the master cylinder pressure sensor (3a, 3b) is malfunctioning.

(11) A brake control apparatus (1) comprising: a master cylinder (2) arranged to raise an internal pressure (Pwc) of a wheel cylinder (4a, 4b, 4c, 4d) of a vehicle in accordance with operation of an input device (brake pedal BP) of the vehicle; a booster (master cylinder pressure control mechanism 5) arranged to raise the internal pressure (Pwc) of the wheel cylinder (4a, 4b, 4c, 4d) by operating the master cylinder (2) independently of operation of the input device (brake pedal BP), the booster (master cylinder pressure control mechanism 5) including an electric motor (50) arranged to operate the master cylinder (2); a pressure regulator (wheel cylinder pressure control mechanism 3) provided with a hydraulic pressure source (hydraulic pump P), and arranged to raise the internal pressure (Pwc) of the wheel cylinder (4a, 4b, 4c, 4d) independently of operation of the master cylinder (2); a plurality of sensors (displacement sensors 7a and 7b, master cylinder pressure sensors 3a and 3b) arranged to collect information used to measure an amount of operation of the input device (brake pedal BP); and a control section (master cylinder pressure controller 8, wheel cylinder pressure controller 9) including: a first controller (master cylinder pressure controller 8) connected for signal communication to the booster (master cylinder pressure control mechanism 5), and configured to control the booster (master cylinder pressure control mechanism 5), the first controller (master cylinder pressure controller 8) including a processor (CPU 80), and a driver (three phase motor drive circuit 84a) configured to drive the electric motor (50); and a second controller (wheel cylinder pressure controller 9) connected for signal communication to the pressure regulator (wheel cylinder pressure control mechanism 3), and configured to control the pressure regulator (wheel cylinder pressure control mechanism 3), the control section (master cylinder pressure controller 8, wheel cylinder pressure controller 9) being configured to: detect that at least one of the booster (master cylinder pressure control mechanism 5) and the first controller (master cylinder pressure controller 8) is in a state of malfunction; select one of backup modes in accordance with the state of malfunction, wherein the backup modes restrict operation of at least one of the booster (master cylinder pressure control mechanism 5) and the pressure regulator (wheel cylinder pressure control mechanism 3) in different manners, and the backup modes include first, second, third backup modes; select the first backup mode in response to detecting that the processor (CPU 80) of the first controller (master cylinder pressure controller 8) is in a state of malfunction; select the second backup mode in response to detecting that the driver (three phase motor drive circuit 84a) of the first controller (master cylinder pressure controller 8) is in a state of malfunction; select the third backup mode in response to detecting that at least one of the sensors (displacement sensors 7a and 7b, master cylinder pressure sensors 3a and 3b) is in a state of malfunction; and control the internal pressure (Pwc) of the wheel cylinder (4a, 4b, 4c, 4d) in the selected backup mode, is effective for producing a suitable braking force as desired by a driver, by suitable selection of one of the backup modes, even when the booster system is malfunctioning, and is advantageous in safety, ease of operation, and comfortability.

(12) The brake control apparatus wherein: the first controller (master cylinder pressure controller 8) includes a circuit (monitoring control circuit 83) configured to monitor a state of the processor (CPU 80); the first controller (master cylinder pressure controller 8) is configured to send to the second controller (wheel cylinder pressure controller 9) a first signal indicative of a request for the first backup mode in response to detecting that the processor (CPU 80) is in a state of malfunction; and the second controller (wheel cylinder pressure controller 9) is configured to control the internal pressure (Pwc) of the wheel cylinder (4a, 4b, 4c, 4d) by operating the pressure regulator (wheel cylinder pressure control mechanism 3)

in accordance with the measured amount of operation of the input device (brake pedal BP) in response to receipt of the first signal (in backup mode 1), is effective for producing a suitable braking force as desired by a driver, by operating the pressure regulator (wheel cylinder pressure control mechanism 3) instead of operation of the booster (master cylinder pressure control mechanism 5), even when the booster system is malfunctioning.

(13) The brake control apparatus wherein: the first controller (master cylinder pressure controller 8) includes a circuit (phase current monitoring circuit 84b, phase voltage monitoring circuit 84c) configured to monitor a state of the driver (three phase motor drive circuit 84a); the first controller (master cylinder pressure controller 8) is configured to send to the second controller (wheel cylinder pressure controller 9) a second signal indicative of a request for the second backup mode in response to detecting that the driver (three phase motor drive circuit 84a) is in a state of malfunction; and the second controller (wheel cylinder pressure controller 9) is configured to control the internal pressure (Pwc) of the wheel cylinder (4a, 4b, 4c, 4d) by operating the pressure regulator (wheel cylinder pressure control mechanism 3) in accordance with the measured amount of operation of the input device (brake pedal BP) in response to receipt of the second signal (in backup mode 2), is effective for generating a suitable braking force as requested by a driver, by operating the pressure regulator (wheel cylinder pressure control mechanism 3) instead of operation of the booster (master cylinder pressure control mechanism 5), even when electric motor 50 cannot be normally controlled.

(14) The brake control apparatus wherein the first controller (master cylinder pressure controller 8) is configured to: detect that at least one of the sensors (displacement sensors 7a and 7b, master cylinder pressure sensors 3a and 3b) is in a state of malfunction; and control the internal pressure (Pwc) of the wheel cylinder (4a, 4b, 4c, 4d) by operating the booster (master cylinder pressure control mechanism 5) in accordance with an output of a normal set of the sensors (displacement sensors 7a and 7b, master cylinder pressure sensors 3a and 3b) in the third backup mode in response to detecting that at least one of the sensors (displacement sensors 7a and 7b, master cylinder pressure sensors 3a and 3b) is in a state of malfunction (in backup mode 31, backup mode 32), is effective for producing a suitable braking force as desired by a driver, by continuing to operate the booster (master cylinder pressure control mechanism 5), even when at least one of the sensors (displacement sensors 7a and 7b, master cylinder pressure sensors 3a and 3b) is malfunctioning.

(15) The brake control apparatus wherein the control section (master cylinder pressure controller 8, wheel cylinder pressure controller 9) is configured to perform a warning operation when in the selected backup mode, is effective for allowing a driver to quickly recognize the state of malfunction, and thereby improving the safety and the reliability.

(16) The brake control apparatus wherein the control section (master cylinder pressure controller 8, wheel cylinder pressure controller 9) is configured to perform: a first operation of determining in relation to selection of the first backup mode whether or not the processor (CPU 80) of the first controller (master cylinder pressure controller 8) is in a state of malfunction; a second operation of determining in relation to selection of the second backup mode whether or not the driver (three phase motor drive circuit 84a) of the first controller (master cylinder pressure controller 8) is in a state of malfunction, after the first operation; and a third operation of determining in relation to selection of the third backup mode whether or not at least one of the sensors (displacement sensors 7a and 7b, master cylinder pressure sensors 3a and 3b) is in a state of malfunction, after the third operation, is effective for efficiently performing the selection of one of the backup modes. This is because detection of malfunctions other than malfunctions of CPU 80 requires that CPU 80 is normal, and detection of malfunctions of sensors is meaningless if electric motor 50 is failed.

Brake control apparatus 1 according to the present embodiment may be modified as follows.

Although wheel cylinder pressure control mechanism 3 has a hydraulic circuit as shown in FIG. 1, the hydraulic circuit may be modified arbitrarily, if the modified wheel cylinder pressure control mechanism can provide similar functions.

Although master cylinder pressure control mechanism 5 includes electric motor 50 and rotation-translation converter 55 for moving the primary piston 2b and raising the master cylinder pressure, master cylinder pressure control mechanism 5 may be constructed to raise the master cylinder pressure using a vacuum pump, or may include a mechanism of another type driven by an electric motor for raising the master cylinder pressure.

Although electric motor 50 is implemented by a three-phase brushless DC motor, electric motor 50 may be implemented by an electric motor of another type such as a DC motor or an AC motor. Three-phase brushless DC motors are generally advantageous in controllability, quietness, and tolerance.

Although speed reducer 51 is implemented by a pulley mechanism, speed reducer 51 may be differently implemented by a gear mechanism.

Although rotation-translation converter 55 is implemented by a ball-screw mechanism, rotation-translation converter 55 may be differently implemented by a rack-and-pinion mechanism.

Although hydraulic pump P in wheel cylinder pressure control mechanism 3 is implemented by a gear pump, hydraulic pump P may be differently implemented by a plunger pump, or a trochoid pump. Gear pumps are generally advantageous in quietness.

This application is based on a prior Japanese Patent Application No. 2007-208869 filed on Aug. 10, 2007. The entire contents of this Japanese Patent Application No. 2007-208869 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
a master cylinder arranged to raise an internal pressure of a wheel cylinder of a vehicle;
a booster arranged to raise the internal pressure of the wheel cylinder by operating the master cylinder by an electric motor in accordance with or independently of operation of a brake pedal of the vehicle;
a pressure regulator provided with a hydraulic pressure source, and arranged to raise the internal pressure of the wheel cylinder independently of operation of the master cylinder; and
a control section including:
a first controller connected for signal communication to the booster, and configured to control the electric motor of the booster, wherein the first controller includes a processor and a driver, wherein the driver is configured to drive the electric motor, wherein sensing information is inputted to the processor from a stroke sensor arranged to measure a stroke of the brake pedal; and a second controller connected for signal communication to the pressure regulator, and configured to control the pressure regulator, to receive input of sensing information from a master cylinder pressure sensor and to receive input of the sensing information from the stroke sensor through the processor, wherein the master cylinder pressure sensor is configured to measure an internal pressure of the master cylinder, the control section being configured to:
detect that at least one of the booster and the first controller is in a state of malfunction;
select one of backup modes in accordance with the state of malfunction,
wherein the backup modes include first and second backup modes;
select the first backup mode in response to detecting a condition that the processor of the first controller is in a state of malfunction;
select the second backup mode in response to detecting a state of malfunction in which it is impossible to normally drive the electric motor of the booster except when detecting the condition;
control the internal pressure of the wheel cylinder by operating the pressure regulator by the second controller based on the sensing information of the master cylinder pressure sensor without operation of the booster when in the first backup mode; and
control the internal pressure of the wheel cylinder by operating the pressure regulator by the second controller based on the sensing information of the stroke sensor when in the second backup mode.

2. The brake control apparatus as claimed in claim 1, further comprising a sensor arranged to collect information used to measure an amount of operation of the brake pedal, wherein:
the first controller includes a circuit configured to monitor a state of the processor;
the first controller is configured to send to the second controller first information concerning the selection of the first backup mode in response to detecting by the circuit that the processor is in a state of malfunction; and
the second controller is configured to control the internal pressure of the wheel cylinder by operating the pressure regulator based on the sensing information of the stroke sensor in response to receipt of the first information.

3. The brake control apparatus as claimed in claim 1, wherein:
the first controller includes a circuit configured to monitor a state of the driver;
the first controller is configured to send to the second controller first information concerning the selection of the second backup mode in response to detecting by the circuit that the driver is in a state of malfunction; and
the second controller is configured to control the internal pressure of the wheel cylinder by operating the pressure regulator based on the sensing information of the master cylinder pressure sensor in response to receipt of the first information.

4. The brake control apparatus as claimed in claim 1, wherein the master cylinder includes a piston arranged to raise an internal pressure of the master cylinder, and the booster includes a mechanism arranged to move the piston of the master cylinder by transmitting an output torque of the electric motor to the piston.

5. The brake control apparatus as claimed in claim 1, further comprising at least one other stroke sensor configured to measure the stroke of the brake pedal, wherein the first controller is configured to:
select a third backup mode in response to detecting that at least one of the stroke sensors is in the state of malfunction; and
control the internal pressure of the wheel cylinder by operating the electric motor of the booster in accordance with an output of a normal one or set of the stroke sensors when in the third backup mode.

6. A brake control apparatus comprising:
a master cylinder arranged to raise an internal pressure of a wheel cylinder of a vehicle;
a booster arranged to raise the internal pressure of the wheel cylinder by operating the master cylinder in accordance with or independently of operation of a brake pedal of the vehicle, the booster including an electric motor arranged to operate the master cylinder;
a pressure regulator provided with a hydraulic pressure source, and arranged to raise the internal pressure of the wheel cylinder independently of operation of the master cylinder;
a stroke sensor configured to measure a stroke of the brake pedal;
a master cylinder pressure sensor configured to measure an internal pressure of the master cylinder; and
a control section including:
a first controller connected for signal communication to the booster, and configured to control the booster, the first controller including a processor, and a driver configured to drive the electric motor,
wherein sensing information is inputted to the processor from the stroke sensor; and
a second controller connected for signal communication to the pressure regulator, and configured to control the pressure regulator, to receive input of sensing information from the master cylinder pressure sensor and to receive input of the sensing information from the stroke sensor through the processor,
the control section being configured to:
detect that at least one of the booster and the first controller is in a state of malfunction;
select one of backup modes in accordance with the state of malfunction, wherein the backup modes include first and second backup modes;
select the first backup mode in response to detecting that the processor of the first controller is in a state of malfunction;
select the second backup mode in response to detecting that the driver of the first controller is in a state of malfunction;
control the internal pressure of the wheel cylinder by operating the pressure regulator by the second controller based on the sensing information of the master cylinder pressure sensor without operation of the booster, when in the first backup mode; and
control the internal pressure of the wheel cylinder by operating the pressure regulator by the second controller based on the sensing information of the stroke sensor when in the second backup mode.

7. The brake control apparatus as claimed in claim 6, wherein:
the first controller includes a circuit configured to monitor a state of the processor;
the first controller is configured to send to the second controller a first request for the first backup mode in response to detecting that the processor is in a state of malfunction; and
the second controller is configured to control the internal pressure of the wheel cylinder by operating the pressure regulator based on the sensing information of the master cylinder pressure sensor in response to receipt of the first request.

8. The brake control apparatus as claimed in claim 6, wherein:
the first controller includes a circuit configured to monitor a state of the driver;
the first controller is configured to send to the second controller a second request for the second backup mode in response to detecting that the driver is in a state of malfunction; and
the second controller is configured to control the internal pressure of the wheel cylinder by operating the pressure regulator based on the sensing information of the stroke sensor in response to receipt of the second request.

9. The brake control apparatus as claimed in claim 6, further comprising at least one other stroke sensor configured to measure the stroke of the brake pedal, wherein the first controller is further configured to:
select a third backup mode in response to detecting that at least one of the stroke sensors is in a state of malfunction; and
control the internal pressure of the wheel cylinder by operating the booster in accordance with an output of a normal one or set of the stroke sensors when in the third backup mode.

10. The brake control apparatus as claimed in claim 6, wherein the master cylinder includes a piston arranged to raise an internal pressure of the master cylinder, and the booster includes a mechanism arranged to move the piston of the master cylinder by transmitting an output torque of the electric motor to the piston.

11. The brake control apparatus as claimed in claim 6, wherein the control section is configured to perform a warning operation when in the selected backup mode.

12. The brake control apparatus as claimed in claim 9, wherein the control section is configured to perform:
a first operation of determining in relation to selection of the first backup mode whether or not the processor of the first controller is in a state of malfunction;
a second operation of determining in relation to selection of the second backup mode whether or not the driver of the first controller is in a state of malfunction; and
a third operation of determining in relation to selection of the third backup mode whether or not at least one of the stroke sensors is in a state of malfunction, after the first and second operations.

* * * * *